(12) United States Patent
Kroon

(10) Patent No.: US 10,638,119 B2
(45) Date of Patent: Apr. 28, 2020

(54) GENERATION OF IMAGE FOR AN AUTOSTEREOSCOPIC DISPLAY

(71) Applicant: KONINKLIJKE PHILIPS N.V., Eindhoven (NL)

(72) Inventor: Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 79 days.

(21) Appl. No.: 15/568,951

(22) PCT Filed: Apr. 22, 2016

(86) PCT No.: PCT/EP2016/058976
§ 371 (c)(1),
(2) Date: Oct. 24, 2017

(87) PCT Pub. No.: WO2016/177585
PCT Pub. Date: Nov. 10, 2016

(65) Prior Publication Data
US 2018/0124383 A1    May 3, 2018

(30) Foreign Application Priority Data
May 5, 2015   (EP) .................................... 15166346

(51) Int. Cl.
*H04N 13/279* (2018.01)
*H04N 13/368* (2018.01)
(Continued)

(52) U.S. Cl.
CPC ......... *H04N 13/305* (2018.05); *H04N 13/279* (2018.05); *H04N 13/302* (2018.05);
(Continued)

(58) Field of Classification Search
CPC .................................................... H04N 13/305
(Continued)

(56) References Cited

U.S. PATENT DOCUMENTS 7,692,640 B2   4/2010   Van Geest et al.
8,427,531 B2   4/2013   Takashima et al.
(Continued)

FOREIGN PATENT DOCUMENTS

WO    2005091050 A1    9/2005
WO    2006117707 A2    11/2006
(Continued)

*Primary Examiner* — Anner N Holder
*Assistant Examiner* — Amir Shahnami

(57) ABSTRACT

A display image for a display panel (503) of an autostereoscopic display projecting the display image in a plurality of view cones is generated. A source (803) provides a three dimensional representation of a scene to be displayed and a generator (805) generates the display image from the representation. For each pixel, the generator (805) determines a scene viewpoint direction indication reflecting a view point direction for the scene in response to a direction mapping function and a view cone projection direction indication reflecting a projection direction for the pixel within the view cones. The direction mapping function reflects a relationship between view cone projection directions and scene view point directions. The pixel value corresponding to the view point direction is then generated from the three dimensional representation. In addition, a processor (809) determines a viewer characteristic; and an adapter (811) for adapts the direction mapping function in response to the viewer characteristic.

20 Claims, 16 Drawing Sheets

(51) Int. Cl.
*H04N 13/305* (2018.01)
*H04N 13/349* (2018.01)
*H04N 13/351* (2018.01)
*H04N 13/376* (2018.01)
*H04N 13/366* (2018.01)
*H04N 13/302* (2018.01)

(52) U.S. Cl.
CPC ......... *H04N 13/349* (2018.05); *H04N 13/351* (2018.05); *H04N 13/366* (2018.05); *H04N 13/368* (2018.05); *H04N 13/376* (2018.05)

(58) Field of Classification Search
USPC .......................................................... 348/59
See application file for complete search history.

(56) References Cited

U.S. PATENT DOCUMENTS

| | | | |
|---|---|---|---|
| 9,479,767 B2* | 10/2016 | Van Der Horst | .... H04N 13/117 |
| 2007/0177006 A1 | 8/2007 | De Zwart et al. | |
| 2011/0193863 A1 | 8/2011 | Gremse et al. | |
| 2013/0050419 A1 | 2/2013 | Nakamura et al. | |
| 2015/0042770 A1 | 2/2015 | Barenbrug et al. | |
| 2015/0049176 A1 | 2/2015 | Hinnen et al. | |
| 2015/0215600 A1* | 7/2015 | Norkin | ................. H04N 13/398 |
| | | | 348/43 |
| 2015/0281682 A1 | 10/2015 | Dimenco | |
| 2016/0219268 A1* | 7/2016 | Strom | ..................... G06F 3/012 |

FOREIGN PATENT DOCUMENTS

| | | |
|---|---|---|
| WO | 2009095852 A2 | 8/2009 |
| WO | 2009095862 A1 | 8/2009 |

* cited by examiner

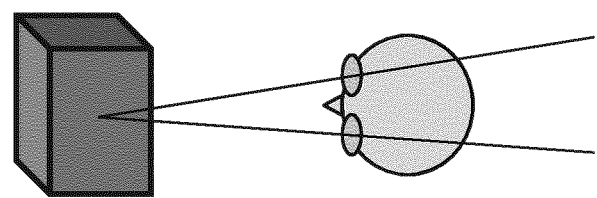
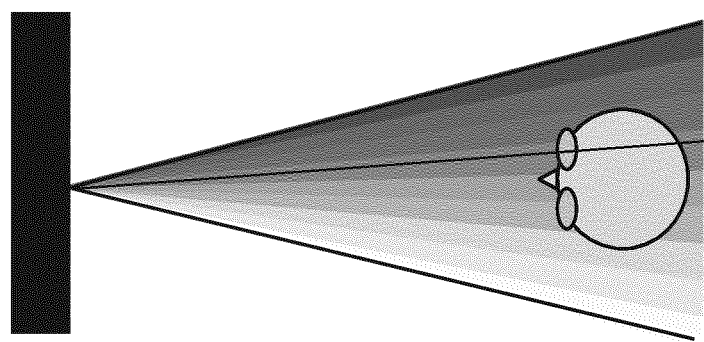
FIG. 10

GENERATION OF IMAGE FOR AN AUTOSTEREOSCOPIC DISPLAY

CROSS-REFERENCE TO PRIOR APPLICATIONS

This application is the U.S. National Phase application under 35 U.S.C. § 371 of International Application No. PCT/EP2016/058976, filed on Apr. 22, 2016, which claims the benefit of EP Patent Application No. EP 15166346.5, filed on May 5, 2015. These applications are hereby incorporated by reference herein.

FIELD OF THE INVENTION

The invention relates to generation of an image for an autostereoscopic display, and in particular, to generation of a display image for a display panel of an autostereoscopic display from an input three dimensional image.

BACKGROUND OF THE INVENTION

Three dimensional displays are receiving increasing interest, and significant research in how to provide three dimensional perception to a viewer is being undertaken. Three dimensional displays add a third dimension to the viewing experience by providing a viewer's two eyes with different views of the scene being watched. This can be achieved by having the user wear glasses to separate two views that are displayed. However, as this is relatively inconvenient to the user, it is in many scenarios desirable to use autostereoscopic displays that directly generate different views and projects them to the eyes of the user. Indeed, for some time, various companies have actively been developing autostereoscopic displays suitable for rendering three-dimensional imagery. Autostereoscopic devices can present viewers with a three dimensional impression without the need for special headgear and/or glasses.

Autostereoscopic displays generally provide different views for different viewing angles. In this manner, a first image can be generated for the left eye and a second image for the right eye of a viewer. By displaying appropriate images, i.e. appropriate from the viewpoint of the left and right eye respectively, it is possible to convey a three dimensional impression to the viewer.

Autostereoscopic displays tend to use means, such as lenticular lenses or parallax barriers/barrier masks, to separate views and to send them in different directions such that they individually reach the user's eyes. For stereo displays, two views are required but most autostereoscopic displays typically utilize more views (e.g. nine views). Indeed, in some displays a gradual transition of view directions is performed over an image such that different parts of an image may be projected in different viewing directions. Thus, in some more recent autostereoscopic displays a more gradual and continuous distribution of image regions over view directions may be applied rather than the autostereoscopic display rendering a fixed number of complete views. Such an autostereoscopic display is often referred to as providing fractional views rather than full views. More information on fractional views may e.g. be found in WO 2006/117707.

In order to fulfill the desire for three dimensional image effects, content is created to include data that describes three dimensional aspects of the captured scene. For example, for computer generated graphics, a three dimensional model can be developed and used to calculate the image from a given viewing position. Such an approach is for example frequently used for computer games that provide a three dimensional effect.

As another example, video content, such as films or television programs, are increasingly generated to include some three dimensional information. Such information can be captured using dedicated three dimensional cameras that capture two simultaneous images from slightly offset camera positions thereby directly generating stereo images, or may e.g. be captured by cameras that are also capable of capturing depth.

Typically, autostereoscopic displays produce "cones" of views where each cone contains multiple views that correspond to different viewing angles of a scene. The viewing angle difference between adjacent (or in some cases further displaced) views are generated to correspond to the viewing angle difference between a user's right and left eye. Accordingly, a viewer whose left and right eye see two appropriate views will perceive a three dimensional effect. An example of such a system wherein nine different views are generated in a viewing cone is illustrated in FIG. 1.

Many autostereoscopic displays are capable of producing a large number of views. For example, autostereoscopic displays which produce nine views are not uncommon. Such displays are e.g. suitable for multi-viewer scenarios where several viewers can watch the display at the same time and all experience the three dimensional effect. Displays with even higher number of views have also been developed, including for example displays that can provide e.g. 28 different views. Such displays may often use relatively narrow view cones resulting in the viewer's eyes receiving light from a plurality of views simultaneously. Also, the left and right eyes will typically be positioned in views that are not adjacent (as in the example of FIG. 1).

Thus, autostereoscopic displays typically do not spread the views over the entire possible viewing or projection angle. In particular, the generated fractional or full views are typically not spread over e.g. a full 180° range, or even over a smaller range of e.g. 90°. Rather, the presented views are typically distributed over a relatively small angle which is known as a viewing cone. The combined viewing angle of the display is then formed by a plurality of repeated viewing cones, each of which provides the same views. Thus, the viewing cones are repeated to provide a projection over the entire viewing angle range of the autostereoscopic display and accordingly the individual views are projected in a plurality of different viewing cones, and in different viewing directions. FIG. 2 illustrates an example of the autostereoscopic display of FIG. 1 projecting a plurality of viewing cones (in the example, three viewing cones are shown).

FIG. 3 illustrates an example of the formation of a pixel (with three color channels) from multiple sub-pixels. In the example, w is the horizontal sub-pixel pitch, h is the vertical sub-pixel pitch, N is the average number of sub-pixels per single-colored patch. The lenticular lens is slanted by $s=\tan\theta$, and the pitch measured in horizontal direction is p in units of sub-pixel pitch. Within the pixel, thick lines indicate separation between patches of different colors and thin lines indicate separation between sub-pixels. Another useful quantity is the sub-pixel aspect ratio: $a=w/h$. Then $N=a/s$. For the common slant 1/6 lens on RGB-striped pattern, $a=1/3$ and $s=1/6$, so $N=2$.

As for conventional 2D displays, image quality is of the utmost importance for a three dimensional display in most applications, and especially is very important for the consumer market, such as e.g. for three dimensional televisions or monitors. However, the representation of different views provides additional complications and potential image degradations.

Practical autostereoscopic displays may generate a relatively large number of viewing cones corresponding to different viewing angle ranges. A viewer positioned within a viewing cone (as in FIG. 1) will be provided with different views for the right and left eyes and this may provide a three-dimensional effect. Further, as a viewer moves, the eyes may switch between different views within the viewing cones thereby automatically providing a motion parallax and corresponding stereoscopic effect. However, as the plurality of views are typically generated from input data representing the central view(s), the image degradation increases for the outer views for which an increased disparity and thus position shifting from the original image is required. Accordingly, as a user moves towards the extreme views at the edges of a viewing cone, a quality degradation is often perceived. Thus, typically, when a viewer moves sideways relative to the autostereoscopic display, he will have a natural experience with the display providing a 3D experience through both the stereopsis and motion parallax effects. However, the image quality is reduced towards the sides.

A particular problem when displaying three dimensional images is that cross-talk may occur between different views. For autostereoscopic displays, cross-talk is typically a significant issue due to the light from individual (sub-)pixels having a relatively large dissemination area. As adjacent (sub-)pixels typically relate to different views, a relatively high interview cross-talk may often be experienced. Thus, it is inherent for autostereoscopic designs that a certain amount of cross-talk is present between adjacent views as part of the light from adjacent (sub-)pixels radiates through the lens in the same direction.

Thus, due to cross-correlation between different views (with different disparities and thus with some depth objects being at different positions), a blurring effect may in practice occur which results in a loss of the sharpness of the image.

Another issue is that due to the limited viewing angle of a viewing cone, it is possible that a viewer may not be fully positioned within a viewing cone but may for example have one eye in one viewing cone and another eye in a neighbor viewing cone as exemplified in FIG. 4. However, this may result in a stereo inversion wherein the right eye receives an image generated for the left eye and the left eye receives the image generated for the right eye. Thus, as a viewer moves towards the end of a view cone and passes into the neighbor view cone with one eye, a stereo inversion occurs which is perceived as very disturbing and uncomfortable to the user.

In order to address this issue, it has been suggested to modify the view cones to have a larger and smoother transition between neighbor view cones. Such an approach is described in more detail in WO 2005/091050. However, although this approach may mitigate stereo inversion it also has some disadvantages. Most significantly, it reduces the viewing range within each viewing cone in which the full three dimensional effect is perceived, i.e. it reduces the sweet spot.

Hence, an improved approach for generating images for autostereoscopic displays would be advantageous, and, in particular, an approach allowing increased flexibility, improved image quality, reduced complexity, reduced resource demand, improved cross-talk performance, mitigated stereo inversion, increased user friendliness and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating a display image for a display panel of an autostereoscopic display, the autostereoscopic display comprising a display arrangement including the display panel and a view forming optical element arranged to project the display image in a plurality of view cones, the apparatus comprising: a source for providing a three dimensional representation of a scene to be displayed; a generator for generating the display image from the three dimensional representation, the generator being arranged to, for each of at least some pixels of the display image: determine a scene view point direction indication reflecting a view point direction for the scene in response to a direction mapping function and a view cone projection direction indication reflecting a projection direction for the pixel within the view cones, the direction mapping function reflecting a relationship between view cone projection directions and scene view point directions; and determine a pixel value corresponding to the view point direction from the three dimensional representation; a processor for determining a viewer characteristic indicative of a number of current viewers; and an adapter for adapting the direction mapping function in response to the viewer characteristic, wherein the adapter is arranged to adapt the direction mapping function to reduce at least one of a scene view point direction deviation and a magnitude of a derivative of the direction mapping function for at least some view cone projection directions in response to the viewer characteristic being indicative of an increasing number of current viewers, a scene view point direction deviation reflecting a deviation from a scene view point direction corresponding to a central view cone projection direction.

The invention may provide an improved three dimensional image from an autostereoscopic display. In particular, it may in many applications provide improved perceived image quality and/or an improved 3D effect for one or more viewers. The approach may provide an improved user experience in many scenarios. The approach may in particular provide an improved dynamic trade-off between blur, 3D effect and risk of stereo inversion.

The approach may in many embodiments control the amount of parallax and thus the three-dimensional effect such that this for at least some viewing positions is reduced for an increasing number of users. The scene view point direction deviation and/or the derivative of the direction mapping function may be reduced for an increasing number of viewers resulting in a reduced parallax difference between the left eye and right eye view for at least some viewing positions. In particular, the parallax for positions towards the end of a viewing cone may be reduced as the number of viewers increases. This may provide an improved user experience in many embodiments. In particular, the risk of a viewer being positioned in a suboptimal viewing position may increase as the number of viewers increases, and the approach may reduce e.g. the risk or degree of stereo inversion that may be perceived by such viewers.

The approach may in some scenarios provide an improved and dynamic trade-off between the three dimensional experience that can be experienced in advantageous viewing positions and the three dimensional experience that can be experienced in disadvantageous viewing positions as the probability of viewers being in a disadvantageous viewing position changes.

The three dimensional representation of a scene may for example be in the form of a three dimensional image of the scene and/or a three dimensional model of the scene.

The display image may be a weaved image. Each pixel of the display panel may within each view cone be projected/radiated/emitted in a projection direction from the display arrangement. The relative projection direction for a pixel may be the same within each view cone (e.g. with respect to an edge/transition or a center of a view cone).

Each pixel may by the direction mapping function be associated with one view point direction reflecting a direction of the view point of the scene that the pixel value for the pixel is generated to reflect/correspond to.

The directions may specifically be angular directions. For example, the direction mapping function may map between view cone projection angles and scene view point angles. The angles may in many scenarioes be determined in a plane, which specifically may be a horizontal plane for the autostereoscopic display when in use.

The direction mapping function may be based on direct directional (e.g. angle) values for view cone projection directions or may provide a mapping from indirect indications. For example, for a first pixel, the view cone projection direction may directly be a direction (e.g. angle) parameter/value or may be a parameter/value which is dependent on or reflect the direction in which that pixel is radiated. For example, the view cone projection direction indication for a pixel may be a position of that pixel, e.g. in the display image/display panel or in a view image prior to weaving to generate the display panel.

The direction mapping function may provide a direct directional (e.g. angle) values for scene view point directions or may provide a mapping to indirect indications. For example, for a first pixel, a nominal disparity value or a disparity scaling value reflecting/corresponding to the view point direction.

The term pixel includes the term sub-pixel such as e.g. a color channel sub-pixel.

The direction mapping function may in many scenarios reflect/describe/define a relationship between the direction/angle in which a given pixel is projected from the autostereoscopic display and the direction in which the scene is "seen" for that pixel.

The viewer characteristic is indicative of a number of current viewers.

This may provide improved performance in many embodiments. In particular, it may in many embodiments allow an improved dynamic trade-off between blur, 3D effect and risk of stereo inversion, and it may in many scenarios allow this trade-off to be appropriately distributed over the current viewers.

In accordance with an optional feature of the invention, the adapter is arranged to adapt the direction mapping function to reduce the scene view point direction deviation for at least some view cone projection directions in response to the viewer characteristic being indicative of an increasing number of current viewers.

This may provide improved performance in many embodiments. In particular, it may in many embodiments allow an improved dynamic trade-off between blur, 3D effect and risk of stereo inversion. In particular, it may mitigate undesirable effects of non-central view cone intervals when it is more likely that viewers will be present in corresponding areas.

In some embodiments, the adapter may be arranged to adapt the direction mapping function to increase the scene view point direction deviation for at least some view cone projection directions in response to the viewer characteristic being indicative of a decreasing number of current viewers.

In accordance with an optional feature of the invention, the adapter is arranged to reduce the derivative of the direction mapping function for at least some view cone projection directions for at least some view cone projection directions in response to the viewer characteristic being indicative of an increasing number of current viewers.

This may provide improved performance in many embodiments. In particular, it may in many embodiments allow an improved dynamic trade-off between blur, 3D effect and risk of stereo inversion.

In some embodiments, the adapter may be arranged to adapt the direction mapping function to increase the derivative of the direction mapping function for at least some view cone projection directions for at least some view cone projection directions in response to the viewer characteristic being indicative of a decreasing number of current viewers.

In accordance with an optional feature of the invention, the adapter is arranged to adapt the direction mapping function to provide a reduced interval of view cone projection directions for which a derivative of the direction mapping function has a same sign as a derivative of the direction mapping function for a central view cone projection direction in response the viewer characteristic being indicative of an increasing number of current viewers.

This may provide improved performance in many embodiments. In particular, it may in many embodiments allow an improved dynamic trade-off between blur, 3D effect and risk of stereo inversion. In particular, it may mitigate undesirable effects of non-central view cone intervals when it is more likely that viewers will be present in corresponding areas.

In some embodiments, the adapter may be arranged to adapt the direction mapping function to provide an increased interval of view cone projection directions for which a derivative of the direction mapping function has a same sign as a derivative of the direction mapping function for a central view cone projection direction in response the viewer characteristic being indicative of a decreasing number of current viewers.

In accordance with an optional feature of the invention, the adapter is arranged to adapt the direction mapping function to reduce a magnitude of a derivative of the direction mapping function at a view cone edge projection direction in response to the viewer characteristic being indicative of an increasing number of current viewers.

This may provide improved performance in many embodiments. In particular, it may in many embodiments allow an improved dynamic trade-off between blur, 3D effect and risk of stereo inversion. In particular, it may mitigate undesirable effects of non-central view cone intervals when it is more likely that viewers will be present in corresponding areas.

In some embodiments, the adapter may be arranged to adapt the direction mapping function to increase a magnitude of a derivative of the direction mapping function at a view cone edge projection direction in response to the viewer characteristic being indicative of a decreasing number of current viewers In accordance with an optional feature of the invention, the viewer characteristic is indicative of a position of at least one viewer.

This may provide improved performance in many embodiments. In particular, it may in many embodiments allow an improved dynamic trade-off between blur, 3D effect and risk of stereo inversion. The position may be a position relative to the display arrangement or the autostereoscopic display.

In accordance with an optional feature of the invention, the adapter is arranged to adapt the direction mapping function to reduce the scene view point direction deviation for at least some view cone projection directions in response to an increasing distance between a viewer position indicated by the viewer characteristic and a central view cone projection direction.

This may provide improved performance in many embodiments. In particular, it may in many embodiments allow an improved dynamic trade-off between blur, 3D effect and risk of stereo inversion. In particular, it may mitigate undesirable effects of non-central view cone intervals when it is more likely that a viewer will be present in corresponding areas.

Equivalently, the adapter may be arranged to adapt the direction mapping function to increase the scene view point direction deviation for at least some view cone projection directions in response to a decreasing distance between a viewer position indicated by the viewer characteristic and a central view cone projection direction.

In accordance with an optional feature of the invention, the adapter is arranged to adapt the direction mapping function to reduce the scene view point direction deviation for at least some view cone projection directions in response to the viewer characteristic being indicative of increasing viewer movement.

This may provide improved performance in many embodiments. In particular, it may in many embodiments allow an improved dynamic trade-off between blur, 3D effect and risk of stereo inversion. In particular, it may mitigate undesirable effects of non-central view cone intervals when it is more likely that a viewer may, at least temporarily, be present in corresponding areas.

Equivalently, the adapter may be arranged to adapt the direction mapping function to reduce the scene view point direction deviation for at least some view cone projection directions in response to the viewer characteristic being indicative of increasing viewer movement.

The viewer movement may be a measure of a change of position of a viewer (with time). Specifically, the viewer movement may reflect a change in position for a viewer during a time interval. In some embodiments, the viewer movement may be an indication of a speed property for one or more viewers, such as for example an average or maximum viewer movement. In some embodiments, the viewer movement may be an indication of a direction of movement for one or more viewers.

In accordance with an optional feature of the invention, the adapter is arranged to adapt the direction mapping function to adapt the display image to correspond to a stereo image if the viewer characteristic is indicative of a number of viewers being less than a threshold.

This may provide an improved user experience in many embodiments.

In accordance with an optional feature of the invention, the adapter is arranged to adapt the direction mapping function to adapt the display image to provide a plurality of sub-viewing cones within each viewing cone of the plurality of viewing cones if the viewer characteristic is indicative of a number of viewers exceeding a threshold.

This may provide an improved user experience in many embodiments.

In accordance with an optional feature of the invention, the three dimensional representation of the scene is an input three dimensional image and the generator is arranged to determine the pixel value corresponding to the view point direction by applying a view direction transformation to the input three dimensional image.

This may provide improved and/or facilitated operation in many embodiments. The invention may in many applications provide improved rendering of a three dimensional image on an autostereoscopic display.

A three dimensional image may be any representation of a three dimensional scene and specifically may be any data providing visual information and depth information. A three dimensional image may e.g. be two or more images corresponding to different viewpoints of a scene. A three dimensional image may e.g. be two 2D images corresponding to a left eye view and a right eye view. In some scenarios, a three dimensional image may be represented by more than two views, such as e.g. by 2D images for 9 or 28 views of an autostereoscopic display. In some scenarios, depth information (e.g. provided as disparity or displacement data) may be provided as part of the three dimensional image. In some embodiments, a three dimensional image may for example be provided as a single image together with associated depth information. In some scenarios, a three dimensional image may be provided as a 2D image from a given view direction together with occlusion data and depth data. For example, a three dimensional image may be provided as a Z-stack representation and an associated depth map.

In accordance with an optional feature of the invention, the direction mapping function comprises a disparity mapping function mapping from a disparity of the input three dimensional image to a disparity of the display image, and the view direction transformation comprises applying a pixel shift to pixels of the input three dimensional image to generate pixels for the display image, the pixel shift being dependent on the disparity mapping function.

This may provide improved and/or facilitated operation in many embodiments. The invention may in many applications provide improved rendering of a three dimensional image on an autostereoscopic display.

According to an aspect of the invention, autostereoscopic display comprising: a display arrangement including the display panel and a view forming optical element arranged to project the display image in a plurality of view cones; a source for providing a three dimensional representation of a scene to be displayed; a generator for generating the display image from the three dimensional representation, the generator being arranged to, for each of at least some pixels of the display image: determine a scene view point direction indication reflecting a view point direction for the scene in response to a direction mapping function and a view cone projection direction indication reflecting a projection direction for the pixel within the view cones, the direction mapping function reflecting a relationship between view cone projection directions and scene view point directions; and determine a pixel value corresponding to the view point direction from the three dimensional representation; a processor for determining a viewer characteristic indicative of a number of current viewers; and an adapter for adapting the direction mapping function in response to the viewer characteristic; wherein the adapter is arranged to adapt the direction mapping function to reduce at least one of a scene view point direction deviation and a magnitude of a derivative of the direction mapping function for at least some view cone projection directions in response to the viewer characteristic being indicative of an increasing number of current viewers, a scene view point direction deviation reflecting a deviation from a scene view point direction corresponding to a central view cone projection direction.

According to an aspect of the invention there is provided a method for generating a display image for a display panel of an autostereoscopic display, the autostereoscopic display comprising a display arrangement including the display panel and a view forming optical element arranged to project the display image in a plurality of view cones; the method comprising: providing a three dimensional representation of a scene to be displayed; generating the display image from the three dimensional representation, the generating comprising, for each of at least some pixels of the display image: determining a scene view point direction indication reflecting a view point direction for the scene in response to a direction mapping function and a view cone projection direction indication reflecting a projection direction for the pixel within the view cones, the direction mapping function reflecting a relationship between view cone projection directions and scene view point directions; and determining a pixel value corresponding to the view point direction from the three dimensional representation; determining a viewer characteristic indicative of a number of current viewers; and adapting the direction mapping function in response to the viewer characteristic; the adapting including adapting the direction mapping function to reduce at least one of a scene view point direction deviation and a magnitude of a derivative of the direction mapping function for at least some view cone projection directions in response to the viewer characteristic being indicative of an increasing number of current viewers, a scene view point direction deviation reflecting a deviation from a scene view point direction corresponding to a central view cone projection direction.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 10 illustrates an example of a mapping of view cone projection angles and scene viewpoint angles by a display system in accordance with some embodiments of the invention;

DETAILED DESCRIPTION OF SOME EMBODIMENTS OF THE INVENTION

Figure 1:
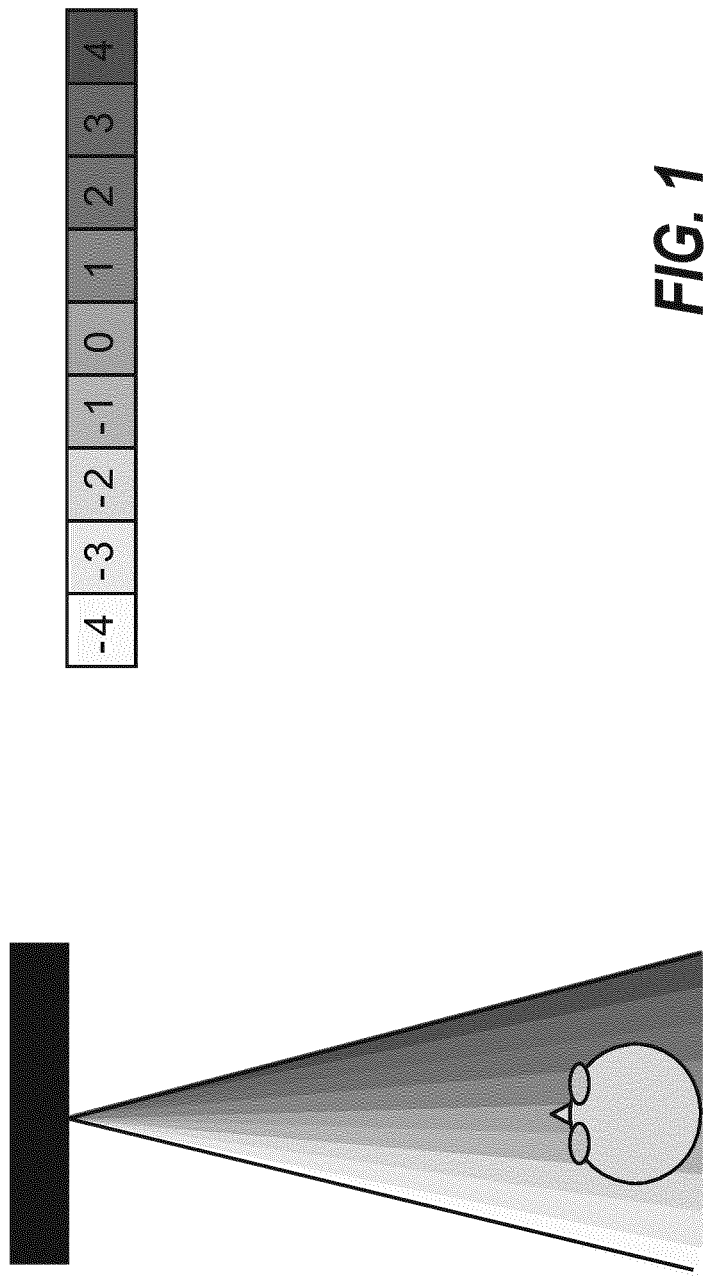
FIG. 1 illustrates an example of views generated from an autostereoscopic display.
Figure 2:
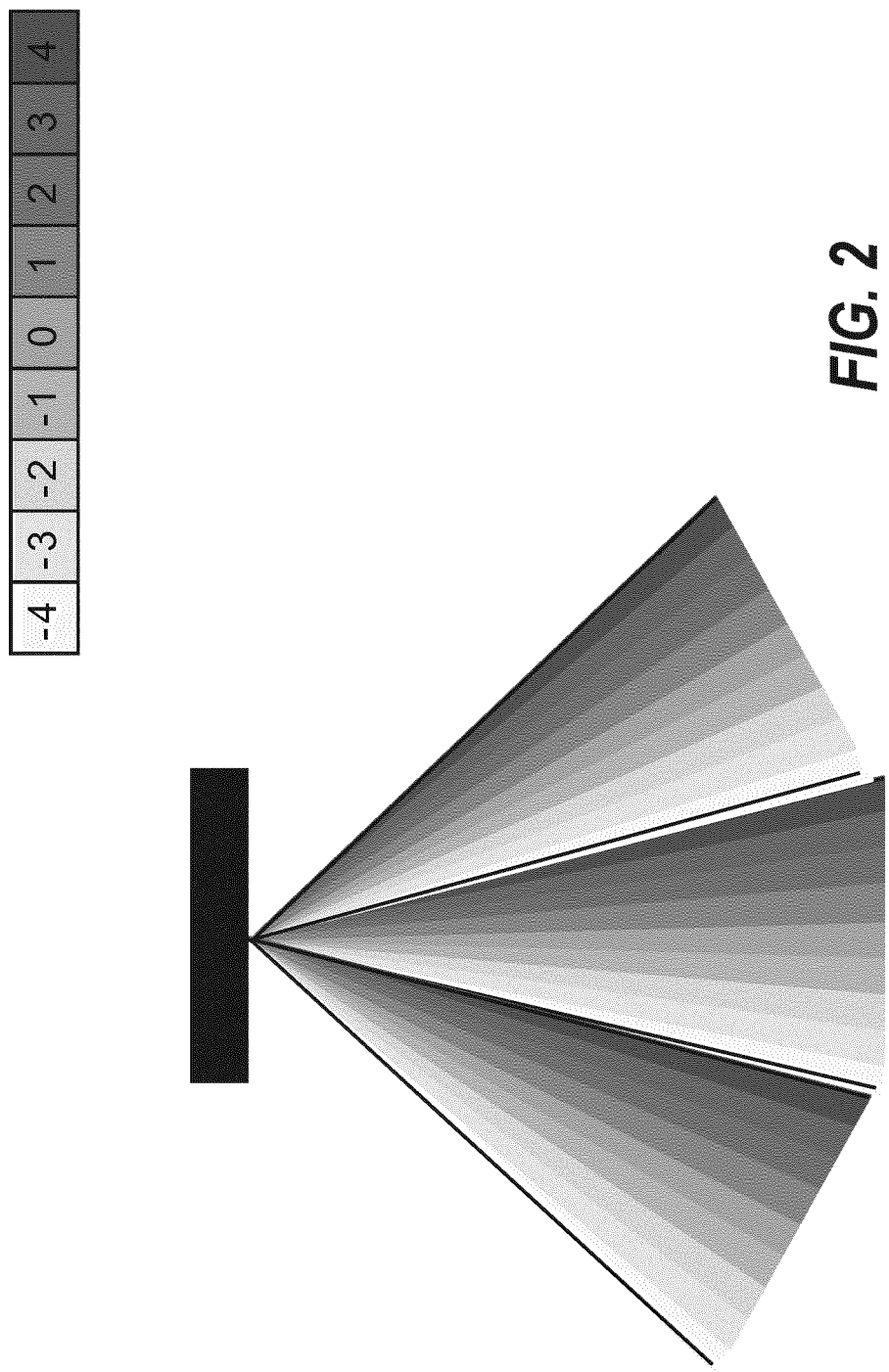
FIG. 2 illustrates an example of viewing cones generated from an autostereoscopic display.
Figure 3:
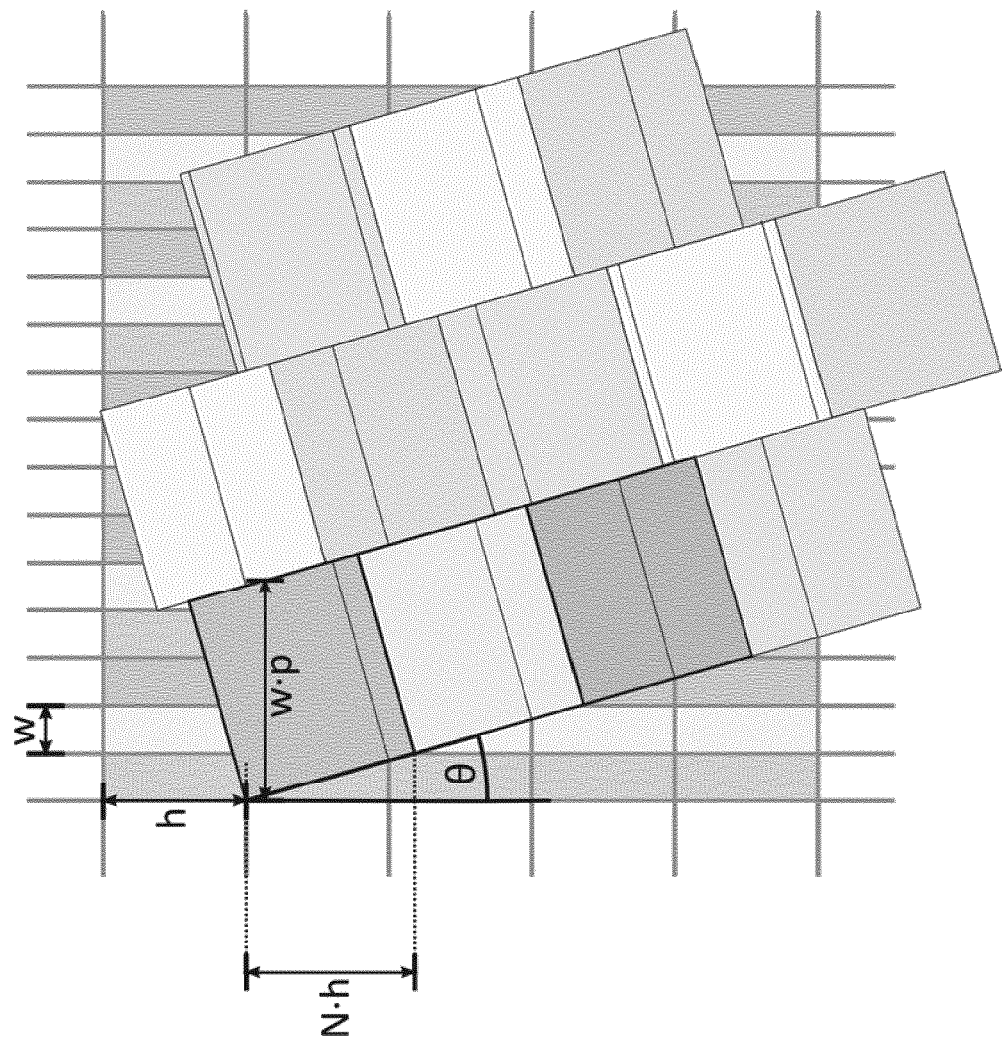
FIG. 3 illustrates an example of a lenticular screen overlaying a display panel of an autostereoscopic display.
Figure 4:
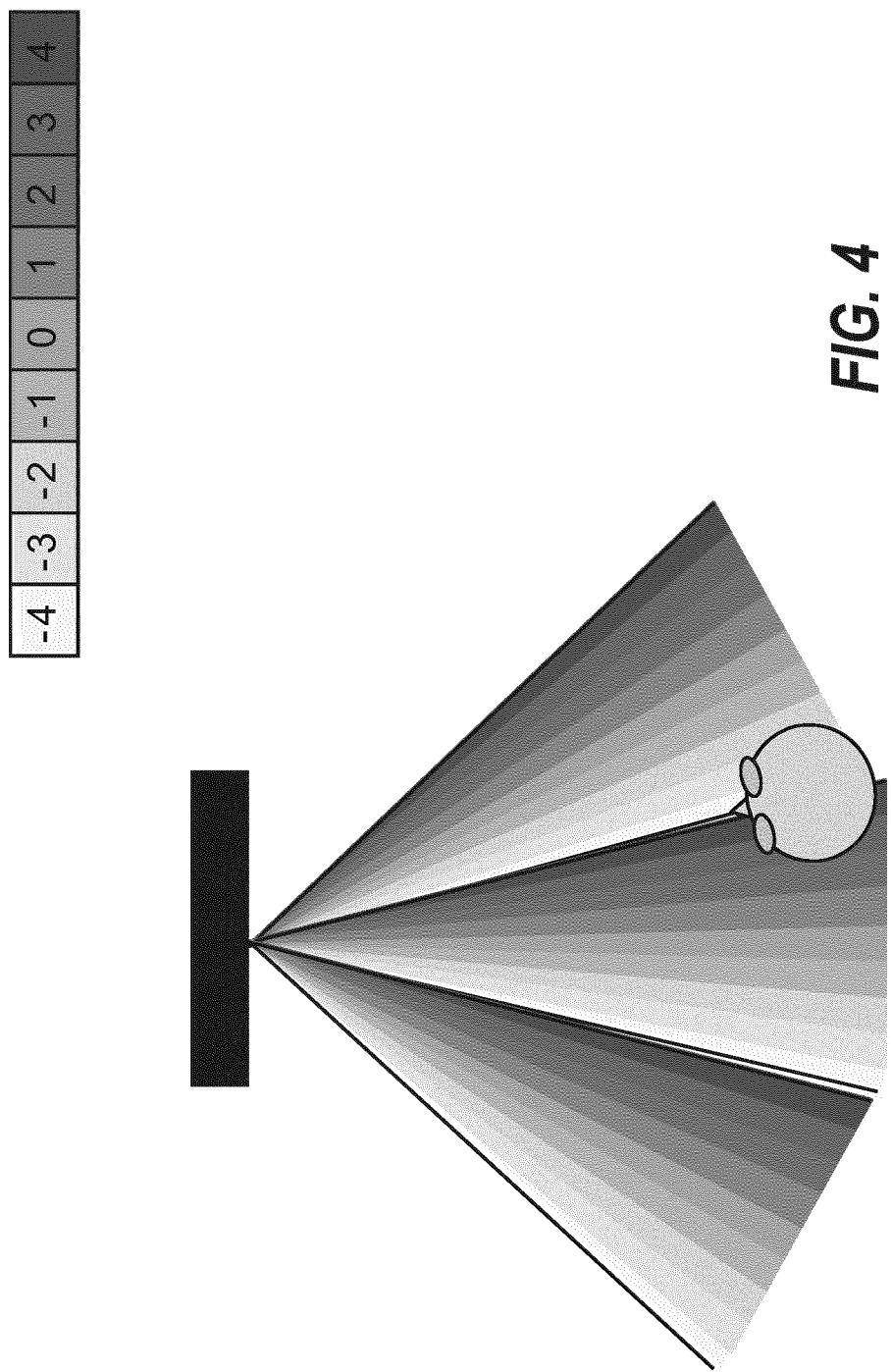
FIG. 4 illustrates an example of a user experiencing stereo inversion between viewing cones generated from an autostereoscopic display.
Figure 5:
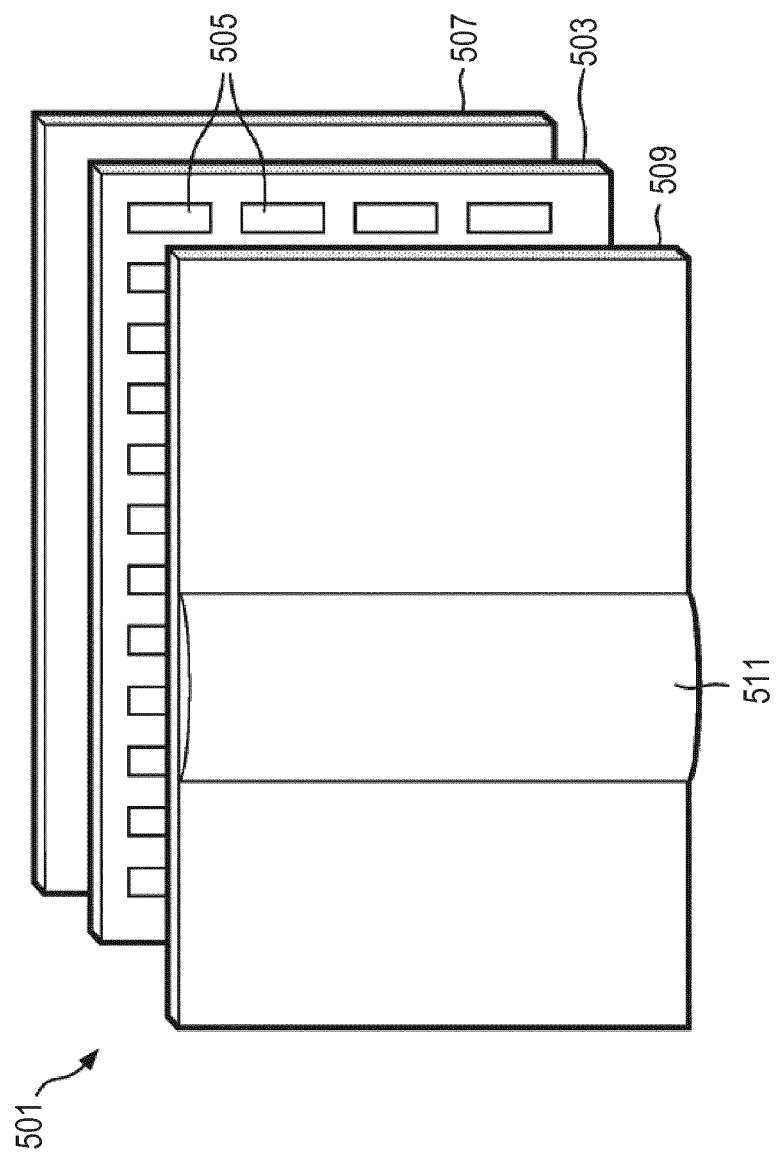
FIG. 5 illustrates a schematic perspective view of elements of an autostereoscopic display device.
Figure 6:
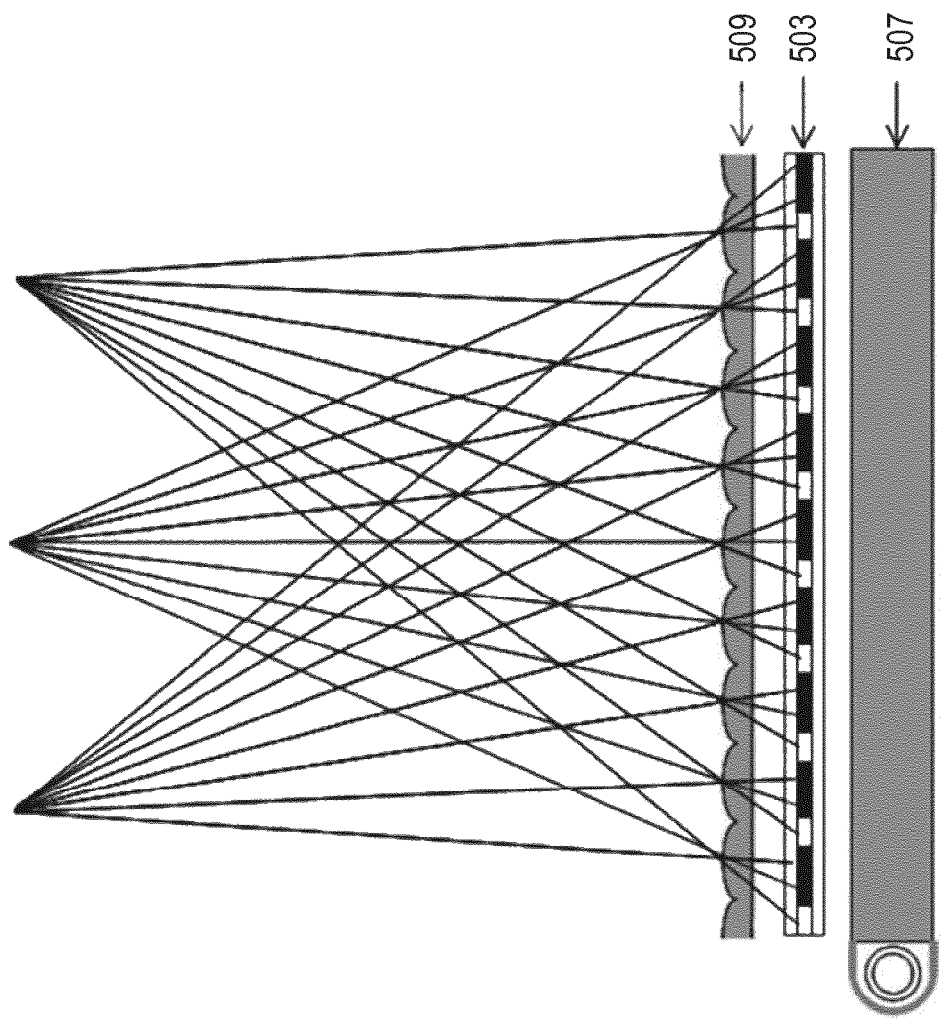
FIG. 6 illustrates a cross sectional view of elements of an autostereoscopic display device.

The autostereoscopic display arrangement 501 of FIGS. 5 and 6 comprises a display panel 503. The display arrangement 501 may contain a light source 507, e.g., when the display is an LCD type display, but this is not necessary, e.g., for OLED type displays.

The display panel 503 comprises a large number of pixels which can be individually driven to provide a given light output. In some embodiments, the light output may be controlled by the display panel 503 modulating (typically attenuating) a light source (such as an LCD panel modulating a backlight (which itself may be variable). In other embodiments, the individual pixel of the display panel 503 may be a light generating and radiating element which itself generates the light.

A pixel may be any addressable element of the display panel 503 which can be used to vary the light output from the display. As such the term pixel may also refer to light varying or controlling elements that only affect e.g. one color channel (also sometimes referred to as a "sub-pixel"). In some embodiments, a pixel may be formed by two or more light controlling elements that are driven together.

The display arrangement 501 also comprises a view forming optical element 509, in the example in the form of a lenticular sheet, arranged over the display side of the display panel 503. The view forming optical element 509 performs a view forming function. The view forming optical element 509 comprises a row of lenticular lenses 511 extending parallel to one another, of which only one is shown with exaggerated dimensions for the sake of clarity. The lenticular lenses 511 act as view forming elements to perform a view forming function. The lenticular lenses of FIG. 5 have a convex facing away from the display panel. It is also possible to form the lenticular lenses with their convex side facing towards the display panel.

The lenticular lenses 511 may be in the form of convex cylindrical elements, and they act as a light output directing means to provide different images, or views, from the display panel 503 to the eyes of a user positioned in front of the display arrangement 501. Thus, different pixels of the display element are projected in different directions from the display. The light directing effect of the lenticular lenses 511 results in the pixels of the display panels being projected or radiated from the display in a range of directions. Specifically, an image of the display panel 503 is projected in an interval of directions (angles) with different pixels being radiated in different directions (angles). Furthermore, the image of the display panel 503 is repeated in a plurality of intervals and specifically each individual pixel is projected in a multiple directions with typically a periodic offset (corresponding to the angular repetition frequency of the intervals in which the display image is projected). In this way, the image of the display panel 503 is projected in a plurality of different viewing cones which each provide the same angle distribution of pixel projections.

Thus, a plurality of view cones are generated with each view cone comprising an interval of projection directions/angles from the display arrangement 501. Each view cone comprises a projection of the display image of the display panel 503 with the display image being distributed over the projection directions/angles of each view cone. In the system, the view cones are repetitions of each other, i.e. the distribution of the display image over the projection angles of a view cone (the view cone projection angles) is the same for all view cones.

Each of the pixels of the display panel 503 is by the view forming optical element 509 projected in a specific view cone projection angle (in each view cone and thus in a plurality of projection angles of the display as a whole). Depending on the specific design of the display arrangement 501, the pixels of the display panel may be divided into groups of pixels where all pixels within one group are projected with the same view cone projection angle. For example, in some displays all pixels of a vertical column are projected in the same horizontal angular direction. In other embodiments, each pixel may be projected in a unique projection angle.

Figure 7:
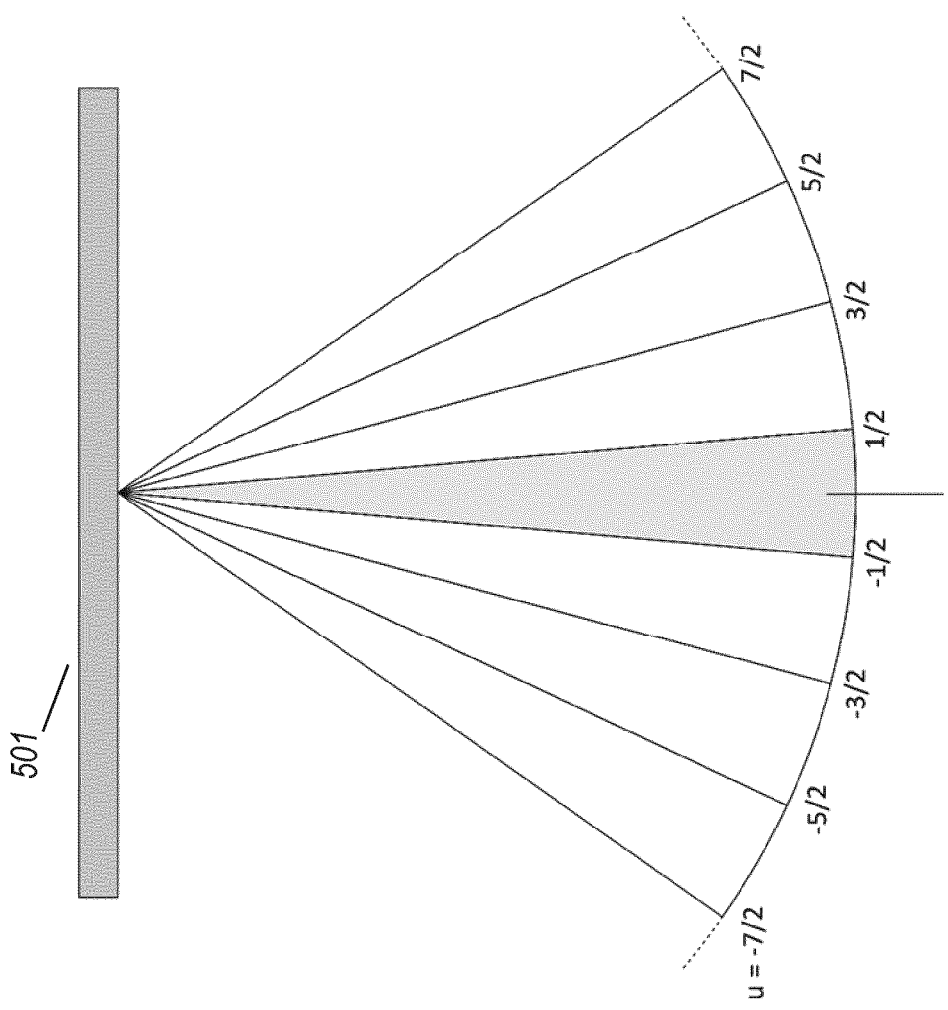
FIG. 7 illustrates an example of viewing cones generated from an autostereoscopic display.

FIG. 7 illustrates an example of the generation of a plurality of view cones from an autostereoscopic display. In the example, each interval indicates a full cone with the lines indicating cone transitions. In the example, each cone angle interval (the width of a cone/distance between two cone transitions) is normalized to unity such that the primary cone corresponds to $u' \in [-\frac{1}{2}, \frac{1}{2}]$, View cone centers, i.e. the central view cone projection angle correspond to $u \equiv 0$ (mod 1) and is typically where the maximum parallax is achieved. View cone transitions correspond to $u \equiv \frac{1}{2}$ (mod 1).

In this example, the range of display projection angles u are thus divided into a plurality of view cones which each comprises an interval $[-\frac{1}{2}, \frac{1}{2}]$ of view cone projection angles $$u_{vc} = \mathrm{mod}\left(u + \frac{1}{2}, 1\right) - \frac{1}{2}$$

In an autostereoscopic display, the difference in the projection directions for the different pixels is used to provide different inputs to the eyes of a viewer thereby providing a 3D effect. In many embodiments, the angle interval is divided into a fixed number of views, such as for example 9, 15 or even 28 views. Each view is generated to correspond to a different view point of the scene and accordingly a viewer whose eyes receive two different views will perceive the scene with the left and right eye having slightly different viewpoints. In this way, a three dimensional image of the scene is perceived. Similarly, a viewer moving between different views will perceive a parallax effect and will accordingly experience a 3D effect.

In such an example, each view presents an entire image of the scene and the view cone is divided into a relatively low number of fixed views (e.g. 9-28 full views). However, recently a more gradual approach has been introduced where each pixel may be rendered to correspond to a slightly different angle, i.e. rather than full images being generated to correspond to one view point, only part of an image may be rendered for a given view point and thus the image perceived by each eye may be formed by parts corresponding to slightly different view points. Indeed, it is possible for each pixel to be rendered to correspond to a slightly different view point and the image perceived by a viewer may be formed by pixels which all correspond to slightly different viewpoints. However, the view point offset between the images and pixels being perceived by the left and right eyes is still maintained at an appropriate size to provide the required 3D effect (both the stereoscopic and parallax effect), and it has in practice been found that the variation in view points for different parts of an image being perceived by one eye does not degrade the perceived image quality as long as the difference is sufficiently low.

The following description will focus on an example where the autostereoscopic display generates a view cone comprising a fixed number (specifically nine) different views where each view comprises an entire image generated to correspond to one view point for the scene. However, it will be appreciated that the described approach is equally applicable to examples where partial image views may be used, including approaches where each pixel is rendered to correspond to a different view point.

Figure 8:
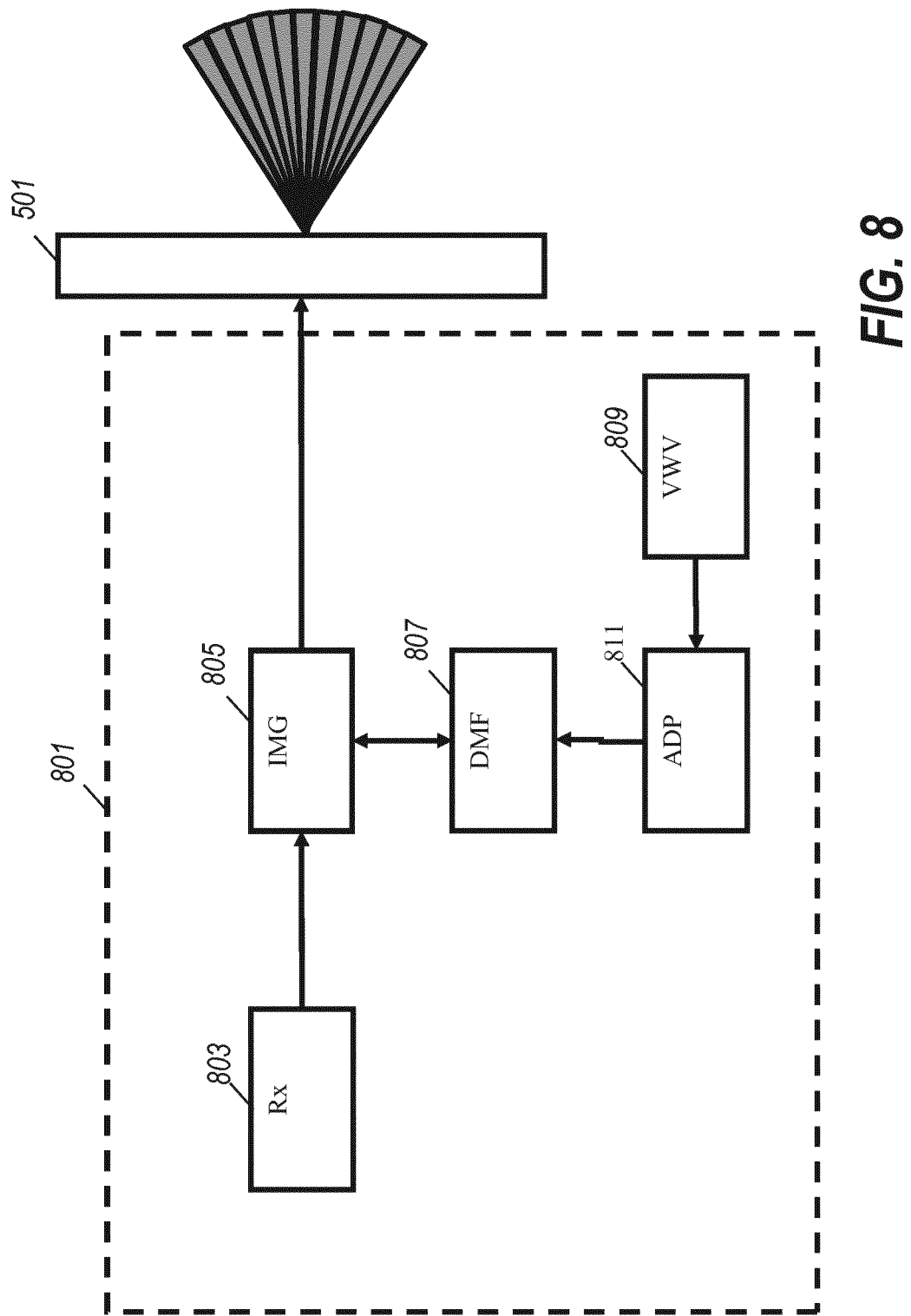
FIG. 8 illustrates an example of a display system in accordance with some embodiments of the invention.

FIG. 8 illustrates an autostereoscopic display in accordance with some embodiments of the invention. The autostereoscopic display comprises an autostereoscopic display arrangement 501 such as that described with reference to FIGS. 5 and 6. In addition, the autostereoscopic display comprises a display driver 801 which is arranged to generate a display image for the display panel 503 of the display arrangement 501 of the autostereoscopic display.

In many embodiments, the display driver 801 may be comprised in the autostereoscopic display itself whereas it in other embodiments may be comprised in a separate unit to the autostereoscopic display. Indeed, in some embodiments, the display driver 801 may for example generate display images which are stored for later use. E.g. the display images may be stored on a suitable carrier from which an autostereoscopic display may retrieve the images and directly provide them to the display panel 503.

The display driver 801 is arranged to generate the display image from a three dimensional representation of a scene to be displayed. Thus, data is provided which provides a 3D description of a scene. The display driver 801 is arranged to process this data to generate a display image that when displayed by the display panel 503 results in a set of view cones being projected with each of them comprising a three dimensional rendering of the scene. Specifically, different view cone projection angles will represent different view points for the scene.

The following description will focus on an example where data providing the three dimensional representation of the scene is in the form of a three dimensional image. This input three dimensional image is then processed as will be described to generate an appropriate 3D presentation of the scene when the display image is rendered by the display panel 503. In particular, as will be described, the appropriate scene view points for the view cone projection angles will be calculated, and the corresponding pixel values for the display panel 503 will be calculated by applying a corresponding view point transformation to the input three dimensional image.

However, in other embodiments, other forms of three dimensional representations may be used. In particular, the three dimensional representation may be in the form of a three dimensional model of the scene. This model can be evaluated for different view points, and thus the appropriate pixel values for the display panel 503 may in such embodiments be determined by evaluating the three dimensional model based on the determined scene view point.

In the specific example of FIG. 8, the display driver 801 is however arranged to generate the display image based on an input three dimensional image which describes/represents a three dimensional scene in a suitable format.

Accordingly, the display driver 801 comprises a source for a three dimensional representation of a scene. In the specific example, the display driver 801 comprises an image receiver 803 which receives an input three dimensional image. The input three dimensional image may for example be a set of N images corresponding directly to the N different views of the scene represented by the input three dimensional image, i.e. N images may be provided which reflect N different view points of the scene. As a specific example, the input three dimensional image may be a stereo image with one image for the right eye and one image for the left eye. As another example, the input three dimensional image may be a single image with an associated depth map (e.g. providing a disparity or depth value for each pixel of the single image). As yet another example, the input three dimensional image may be a Z-stack with an associated depth map. Thus, an input three dimensional image may typically be any data providing (simultaneous) visual and depth information for a scene represented by the input three dimensional image.

The input three dimensional image may be received from any suitable internal or external source, such as from a local memory, from a storage media, from a remote network server, from a radio broadcast etc. In some embodiments, the input three dimensional image may be a single stationary image. In other embodiments, the input three dimensional image may be a single image (a single frame) of a three dimensional video sequence.

The image receiver 803 is coupled to an image generator 805 which is fed the input three dimensional image. The image generator 805 is coupled to the display arrangement 501, and specifically to the display panel 503 of the autostereoscopic display arrangement 501. The image generator 805 is arranged to generate a display image for the display panel 503 such that when this is displayed on the display panel, it results in the projection of viewing cones comprising images determined by the display image.

The image generator 805 is thus arranged to generate a display image for the display panel 503 which will result in the projection of the desired views from the autostereoscopic display.

For example, if N views are to be projected in each view cone, the display image is generated to result in N views being projected. This may be achieved in accordance with the principle of dividing the view cone projection direction interval into N consecutive sub-intervals with each one being arranged to project one view image. The display panel 503 is then divided into N different pixel groups with each group corresponding to one of the N consecutive sub-intervals, i.e. to one of the views. For each of the subgroups, an image is generated by the image generator 805 corresponding to the desired view point for the specific view image. The display image is then generated by combining the individual view images into the combined display image by mapping pixels of the view images to the pixels of the display image that are projected in the appropriate subinterval. The resulting image is generally referred to as a weaved image.

Thus, in many embodiments, the image generator 805 may generate a weaved image by interleaving suitable pixel columns from the individual view images in order to generate an image that can be rendered directly by the display panel 503 allowing the view forming layer 509 to generate the different views.

For clarity and brevity, the following description will focus on a single horizontal line and the projection directions will be represented by the specific projection angles. Accordingly, the references to projection angle in the following may be considered to provide a shortened reference to projection directions. Similarly, references to (scene) view point angles or (scene) view angles may be seen as representations of (scene) view point directions or (scene) view directions.

Thus, in the system, the display arrangement 501 projects the images in a display projection angle interval which is relatively large (often acceptable viewing angles exceed 100° for an autostereoscopic display). However, this interval is divided into a number of repeated intervals that each provides the same representation, i.e. it is divided into a plurality of view cones. Each of these view cones comprises an interval or range of projection angles.

In the specific example, each view cone may have a width of 10°. Thus, the full interval of display projection angles are divided into a number of subranges or sub-intervals of view cone projection angles. Each view cone provides the same image representation, i.e. the display image is rendered in each view cone (distributed over the view cone projection angles).

Accordingly, the image generator 805 is arranged to generate the display image such that a projected image is distributed over the view cone projection angles such that a user positioned in a view cone will perceive a suitable three dimensional rendering of the scene. In order to achieve this, the image generator 805 generates the pixel values for the display panel 503 such that the image parts that are projected in the different view cone projection angles reflect a view of the scene corresponding to those angles, i.e. such that the view point represented by the pixel controlling light in a given view cone projection angle corresponds to that angle.

In order to do so, the image generator 805 includes a mapping which relates the view cone projection angles to (typically virtual) view point angles of the scene. Thus, the generation of the image generator 805 is based on a mapping between view cone projection angles and scene view point angles. The image generator 805 includes a direction mapping function which provides such a mapping.

In the example of FIG. 8, the display driver 801 accordingly comprises a mapping data unit 807 which provides a direction mapping function to the image generator 805. For example, the mapping data unit 807 may be a memory or store which stores data defining a suitable one or more direction mapping functions to be used by the image generator 805. In other embodiments, the mapping data unit 807 may be a processing unit which can calculate a suitable direction mapping function, e.g. by selecting appropriate parameter values.

Figure 9:
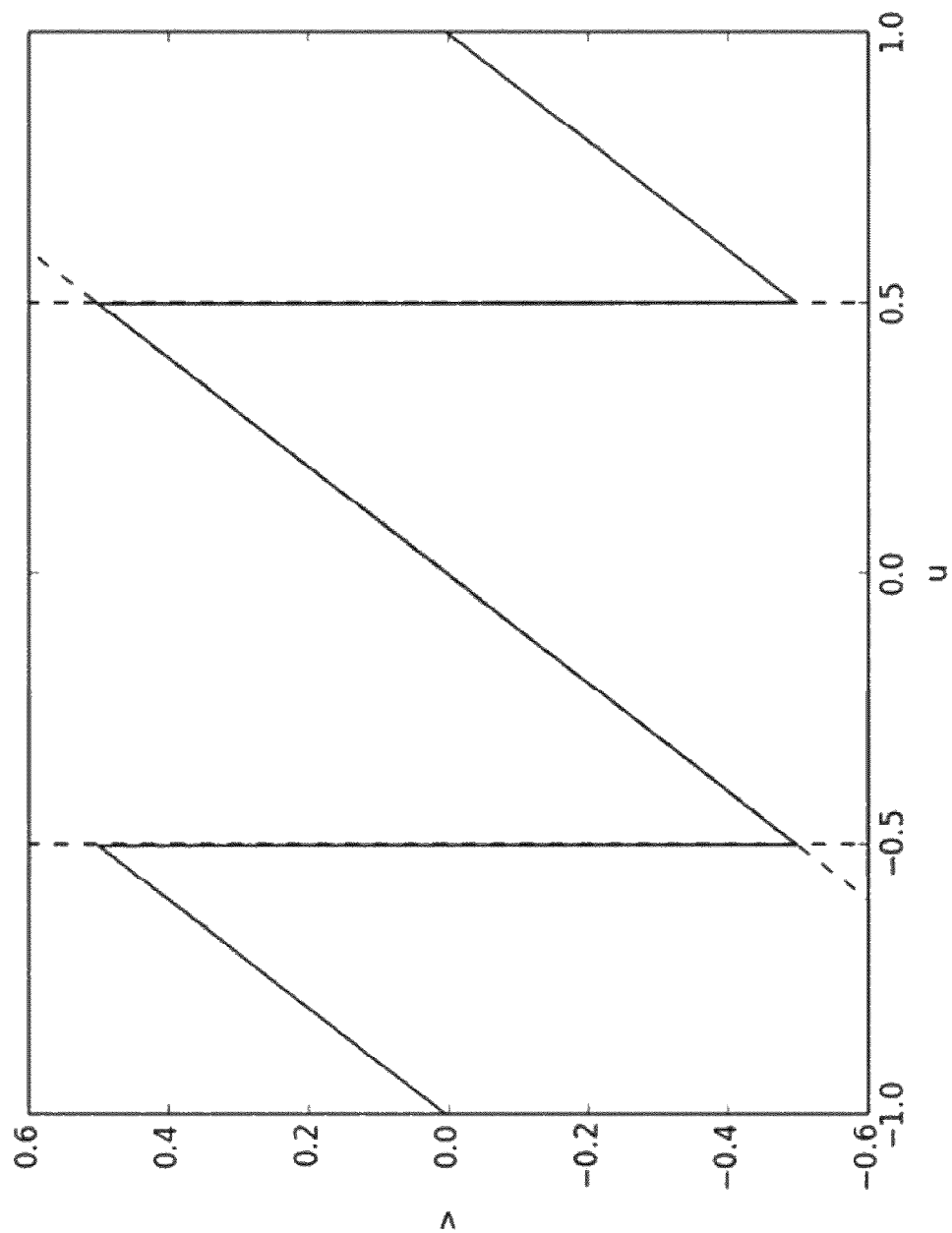
FIG. 9 illustrates an example of a direction mapping function for a display system in accordance with some embodiments of the invention.

An example of a frequently used mapping is illustrated in FIG. 9. In this example, the x-axis represents the view cone projection angles and the y-axis represents the scene view point angle v where the scene view point angle v is also normalized to the interval of [−0.5;0.5]. In the example, there is a direct linear relation between these, i.e. the direction mapping function is a straight linear mapping. In the example, the values have been normalized and thus the gradient of the linear mapping is one. It will be appreciated that the exact non-normalized mapping depends on the specific intended 3D effect.

Specifically, the image generator 805 may when determining a pixel of the display panel 503 proceed to determine a scene view point direction indication which reflects a viewing direction for the scene. The scene view point direction may be determined in response to a direction mapping function which as an input has a view cone projection direction indication which reflects a projection direction for the pixel within the view cones. The distortion measure provides a mapping between view cone projection directions and scene view point direction.

Specifically, the image generator 805 proceeds to first determine an indication of the view cone projection angle for a given first pixel. This indication may be any parameter that is dependent on the view cone projection angle and specifically may be a value that has a direct correspondence with the view cone projection angle. Specifically, the projection angle for a given pixel depends on the physical characteristics of the display arrangement 501 and accordingly there is a direct correspondence between the position of a pixel and the view cone projection angle. Thus, in many embodiments, the position of the pixel may directly be used as a view cone projection direction indication. In other embodiments, other indications of the view cone projection angle may be used. For example, in some embodiments, the view cone projection angle may be directly determined and used. In yet other embodiments, a nominal disparity value for a given nominal depth may be used as an indication of the view cone projection angle.

As the view cone projection angle for a given pixel is depending on the specific geometries of the display arrangement 501, the direction mapping function is typically designed during manufacture to reflect the relationship between the view cone projection angle indication and the view cone projection angle. For example, the relationship between display panel 503 pixel positions and view cone projection angles depends on the display arrangement 501 geometry and is accordingly typically determined during manufacture/design of the display arrangement 501.

The direction mapping function provides a mapping between an input variable providing an indication of the view cone projection angle and an output variable reflecting a corresponding scene view point angle. Thus, the direction mapping function provides a mapping for a pixel of the display arrangement 501 between the angle in the view cones at which the pixel is projected or radiated from the display and the viewing angle of the scene for which the pixel value is generated.

In the example of FIG. 9, the direction mapping function provides a straight linear mapping. For example, the 10° angle interval of the projected view cone may be directly mapped to a 10° angle interval for the view point of the scene. However, it will be appreciated that in other embodiments the mapping may be between different (angular) ranges. Often, autostereoscopic displays tend to have less depth than stereoscopic displays and often the viewer may experience a hypostereo 3D effect.

FIG. 10 illustrates an example where a user is positioned within a view cone and with the left and eye positioned at different angular positions, i.e. at different view cone projection angles. Specifically, the left eye receives and perceives the pixels of the display panel 503 which are projected along direction 1001 and the right eye receives and perceives the pixels of the display panel 503 which are projected along direction 1003. A first set of pixels perceived with the left eye are accordingly those that have view cone projection angle corresponding to direction 1001. However, the direction mapping function relates this angle to a scene view point angle 1005 which corresponds to a position of a (virtual) viewer viewing the virtual scene which is displayed. Thus, when generating the pixel values for the first set of pixels, the image generator 805 has generated these to correspond to a viewer along view point angle 1005. Thus, the first set of pixels provide an image (or part of an image) corresponding to that perceived by the left eye of a viewer positioned at the determined scene view point angle. Similarly, the pixel values for a second set of pixels perceived with the right eye are generated to correspond to scene view point angle 1007, i.e. to correspond to that perceived by the right eye of the virtual viewer. Thus, the real person 1009 viewing the autostereoscopic display perceives the left and right eye images that are calculated to correspond to respectively the left and right eye images of the virtual viewer.

If the viewer of the autostereoscopic display moves within the view cone, the view cone projection angles reaching the right and left eyes will change corresponding to the changes to the left and right eye images of the virtual viewer if he moves. Thus, both a stereoscopic and parallax three dimensional effect is provided.

The direction mapping function provides a mapping from the view cone projection angle to a scene viewpoint angle for pixels of the display panel 503. The mapping may as mentioned be based on actual angle values, or typically be based on parameters that are indicative of these, such as based on the positions of the pixels.

Thus, once the image generator 805 has determined a scene view point angle for a given pixel based on the view cone projection angle indication for the pixel (such as the position), the image generator 805 can proceed to generate a pixel value corresponding to the scene viewpoint angle. Thus, the image generator 805 generates the pixel values for the display panel 503 to correspond to the scene viewpoint angles determined for the individual pixels based on the direction mapping function (from the view cone projection angle).

In some examples, such as e.g. in FIG. 10, the generation of a pixel value may be by evaluating a three dimensional model of the scene based on the scene viewpoint angle for the pixel. The skilled person will be aware of many approaches for determining pixel values based on a three dimensional model and a scene viewpoint angle and this will for brevity not be described further.

In some embodiments, the representation of the three dimensional scene is by a three dimensional image. For example, a two dimensional image with a depth or disparity map may be provided. In such a case, the pixel values for a given determined scene viewpoint angle may be determined by a view direction transformation to the input three dimensional image. For example, the scene view point represented by the two dimensional image may be set to correspond to the scene viewpoint angle that maps to the central view cone projection direction, i.e. to correspond to the middle of the view cone. Accordingly, for the central view cone projection angle and corresponding central scene viewpoint angle, the pixel values are generated directly as the pixel values of the input image. As a result, the autostereoscopic display projects a central view cone image which corresponds to the two dimensional image.

When determining a pixel value for a pixel with another view cone projection angle, and thus a different scene viewpoint angle than the view point angle of the received two dimensional image, the image generator 805 may determine the pixel value by shifting pixels of the two dimensional image by an amount corresponding to the difference in scene view point angle between the central scene view point angle and the determined scene view point angle. Specifically, the disparity for the scene view point angle may be determined, followed by the pixel value being determined as one being offset from the current position by a corresponding amount. It will be appreciated that pixel shifting may be based on looping through pixels of the input two dimensional image and finding appropriate shifts of these in order to populate the display image or may equivalently be based on looping through pixels of the display panel 503 and applying appropriate shifts to generate the pixel values from the correspondingly offset pixels of the input two dimensional image. It will also be appreciated that de-occlusion (hole filling) approaches may be used, such as e.g. based on interpolation.

As a specific example, a horizontal shift may be determined as:

$$\Delta x = f(u)d(x)$$

where f(u) is a direction mapping function, u is a variable reflecting the view cone projection angle, and d(x) is an input image disparity value. Thus, in this example, an output disparity value Δx is generated from an input disparity value d(x) and accordingly the direction mapping function may in the specific example be a disparity scaling function which performs a mapping from the input disparity for a pixel to an output disparity for the pixel.

It will be appreciated that the person skilled in the art will be aware of many different approaches for performing view point transformations for three dimensional images and in general for generating pixel values corresponding to specific view point directions, and that any such suitable approach may be used without detracting from the invention.

With the direction mapping function example of FIG. 9 a homogeneous view projection is provided across the view cone and a viewer will receive substantially the same three dimensional effect regardless of where he is positioned in the view cone. Similarly, a homogenous parallax effect is provided across the view cone.

Figure 11:
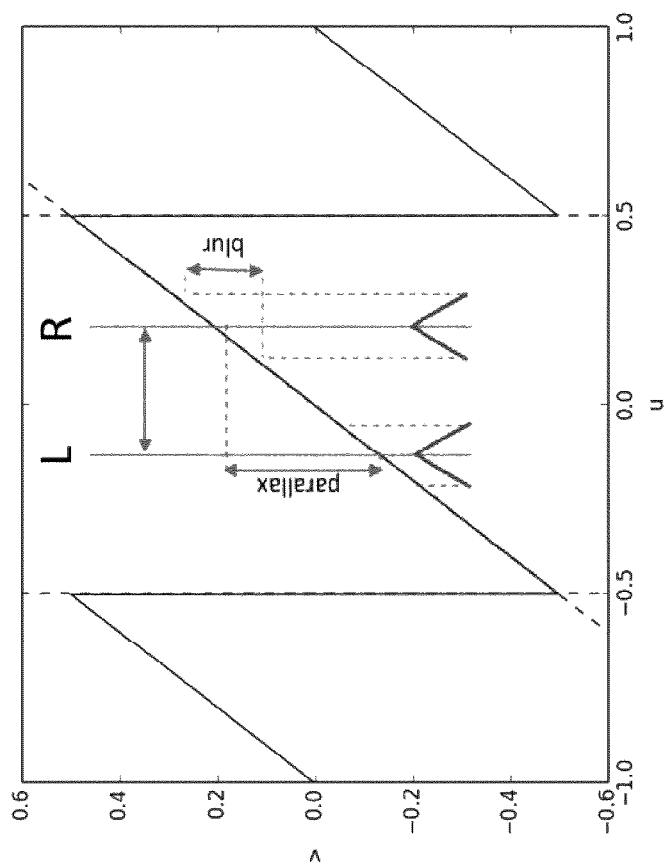
FIGS. 11-16 illustrate examples of direction mapping functions for a display system in accordance with some embodiments of the invention.

However, the approach also has some disadvantages. Indeed, as illustrated by FIG. 11, the left and right eyes (indicated by L and R) do not only receive and perceive the light from a single view cone projection angle but rather receive light from a plurality of directions (typically a short range). Any difference between these will cause image degradation in the form of blur. Specifically, the difference in disparity offsets between different viewing angles for out-of-screen objects will introduce blur. Part of the blurring will be caused by display cross talk between different views (or different view cone projection angle). The blur is dependent on the differences between the images/light projected in the different directions. Thus, the blur will typically increase with increasing disparity/scene viewpoint angle differences.

Furthermore, when the user is positioned at a cone transition (with the eyes in different view cones), a stereo inversion occurs. This may be perceived as highly disturbing to a viewer and especially to a user who moves from one view cone to another.

Figure 12:
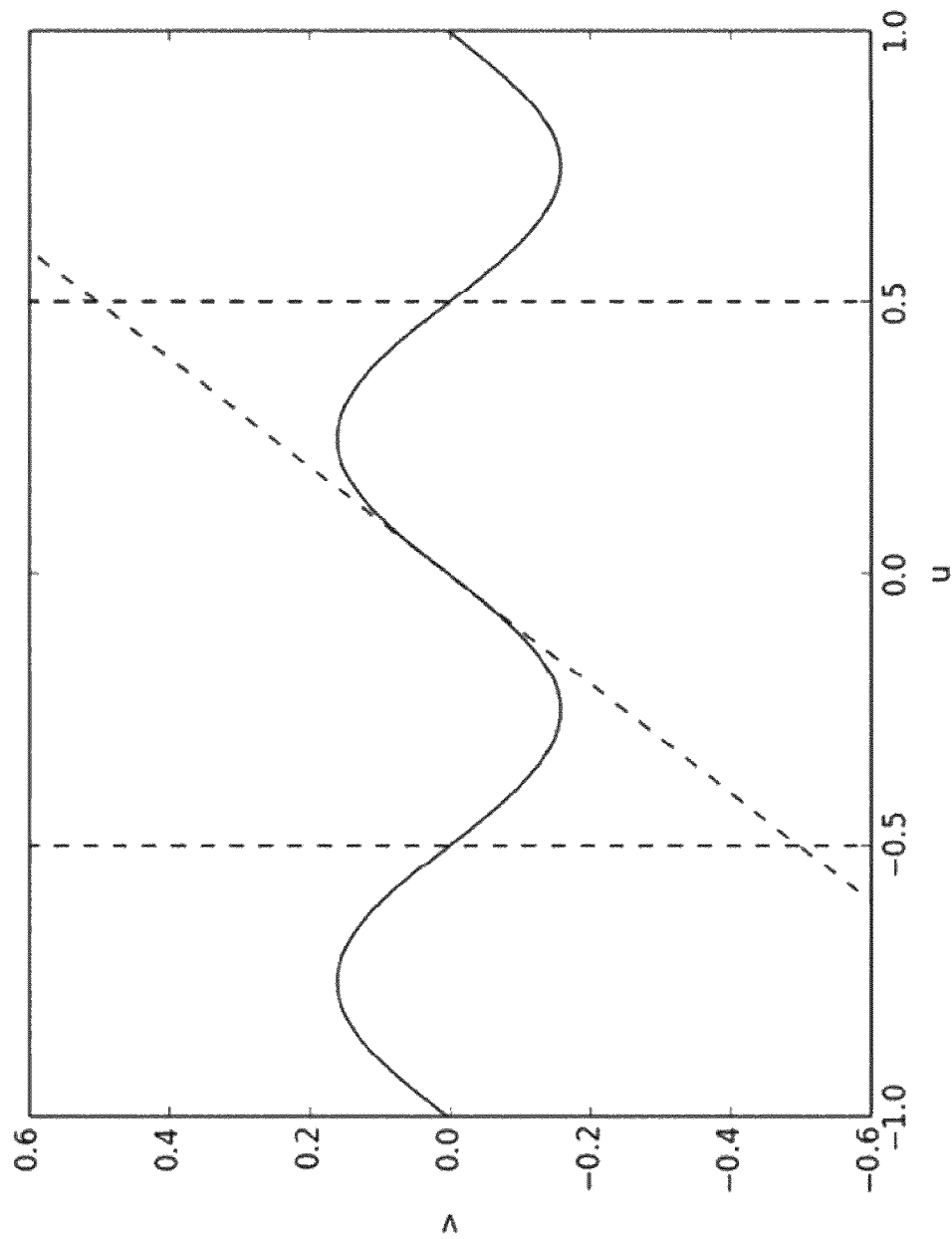

In order to address these issues, it has been proposed in WO 2005/091050 that instead of using the linear mapping of FIGS. 9 and 11, a sine wave mapping such as that illustrated in FIG. 12 may be used. In such an approach, a stereo inversion may still occur at the cone transition but the magnitude of this stereo inversion may be reduced substantially. In particular, the very strong inverse disparity occurring for a user at the cone transition may be reduced to a relatively small inverse disparity. Furthermore, a gradual introduction and change in the stereo inversion can be achieved. These features have found to very substantially reduce the disturbing effect to a user. Further, the disparities and thus the differences between different views may be reduced leading to reduced blur caused by out of screen objects.

However, whereas such a mapping may mitigate some of the effects of the linear (sawtooth) mapping, it also reduces the range in which a full 3D effect is provided. For example, although the stereo inversion may be reduced, the range in which it occurs may be substantially increased. In addition, a non-homogenous view cone is generated and thus the 3D perception and perceived image quality may vary between different positions.

The system of FIG. 8 is arranged to provide a flexible adaptation of the direction mapping function such that the projected images from the autostereoscopic display can be flexibly and dynamically adapted to provide improved trade-off between the advantages and disadvantages of different direction mapping functions.

Specifically, the display driver 801 comprises a viewing processor 809 for determining a viewer characteristic which is arranged to determine an indication of a characteristic of a viewing scenario. Specifically, the viewing processor 809 generates an indication of the number of current viewers and/or a position of one or more current viewers.

It will be appreciated that the skilled person will be aware of various approaches and techniques for determining such viewing characteristics and that any suitable approach may be used without detracting from the invention.

For example, the viewing processor 809 may receive images from a video camera and perform face detection to determine a number and (e.g. angular) position of the viewers. As another example, the viewing processor 809 may perform eye tracking. As another example, a depth sensing camera may be used to detect objects in the viewing environment (also referred to as skeleton tracking).

The viewing processor 809 is coupled to an adapter 811 which is arranged to adapt the direction mapping function in response to the viewer characteristic. Thus, the display driver 801 may dynamically adapt the direction mapping function to reflect the current viewing scenario, and specifically the current number of users. This may substantially improve the viewing experience in many scenarios.

It will be appreciated that many different approaches for adapting the direction mapping function may be applied in different embodiments.

For example, in some embodiments, the adaptor 811 may be arranged to select between a plurality of direction mapping functions depending on the viewer characteristic. For example, the mapping data unit 807 may comprise a memory storing a plurality of predetermined direction mapping functions. The adaptor 811 may be arranged to select one of these predetermined direction mapping functions depending on the viewer characteristic, i.e. a predetermined direction mapping function is selected based on the current number of viewers.

As a specific example, a first predetermined direction mapping function may be stored for one viewer being present, a second predetermined direction mapping function for two viewers being present, a third predetermined direction mapping function for three to five viewers being present, and a fourth predetermined direction mapping function may be stored for more than five viewers being present. The viewing characteristic may indicate how many viewers are currently present, and the adaptor 811 may control the mapping data unit 807 to provide the corresponding predetermined direction mapping function to the image generator 805.

In the system of FIG. 8, the adaptor 811 is arranged to adapt the direction mapping function such that at least for some view cone projection angles/directions the three dimensional effect is reduced for an increasing number of viewers.

Specifically, in some embodiments the magnitude of a derivative of the direction mapping function may be reduced for at least some values of the view cone projection angle. Thus, the local change in the scene viewpoint for a changing view cone projection angle may be reduced resulting in a reduced parallax being generated/perceived by a viewer. Thus, the (absolute value of the) gradient of the direction mapping function may be reduced for at least some view cone projection angles as the number of viewers increases. In such embodiments, the direction mapping function may thus become smoother with a smaller local variation as the number of viewers increases.

In some embodiments, the reduction in the three dimensional effect may be achieved by the adaptor 811 being arranged to modify the direction mapping function such that the deviation from the scene view point direction corresponding to the central view cone projection direction is reduced for at least some values of the view cone projection angle. As the number of users increases, the scene view point direction deviation (i.e. the deviation of the scene viewpoint angle/direction from the center of the cone) is reduced for at least some values.

Both approaches may thus be directed to reducing the degree of parallax resulting from the application of the direction mapping function as the number of viewers increases. The adaptor 811 may reduce the gradient/absolute values of the generated scene viewpoint angle as the number of viewers increases thereby providing e.g. a less aggressive three dimensional effect. This may reduce the three dimensional effect for a viewer in an ideal position but may also reduce the undesired effects (e.g. blur or stereo inversion) for viewers in a more disadvantageous position for three dimensional viewing. The current approach of providing a dynamic adaptation based on the number of viewers allow for dynamically improved trade-off resulting in an improved user experience in many applications.

It will be appreciated that in many embodiments, the adaptor 811 may be arranged to modify the direction mapping function for increasing viewers such that both the scene view point direction deviation reduces for at least some values of the view cone projection angle and the amplitude of the derivative of the direction mapping function reduces for at least some values of the view cone projection angle. Indeed, it will be appreciated that typically the direction mapping function is modified for an increasing number of viewers such that the three dimensional effect is reduced by the direction mapping function being modified to reduce both the deviation from the center (for at least some values of the view cone projection angle) and reducing the gradient of the direction mapping function (for at least some values).

In some embodiments, the direction mapping function may be continuously adapted by modifying a continuous parameter. A particular advantage of such an approach is that it allows for facilitated temporal low-pass filtering to mitigate strong visible changes due to changes of the direction mapping function/cone shape.

Figure 13:
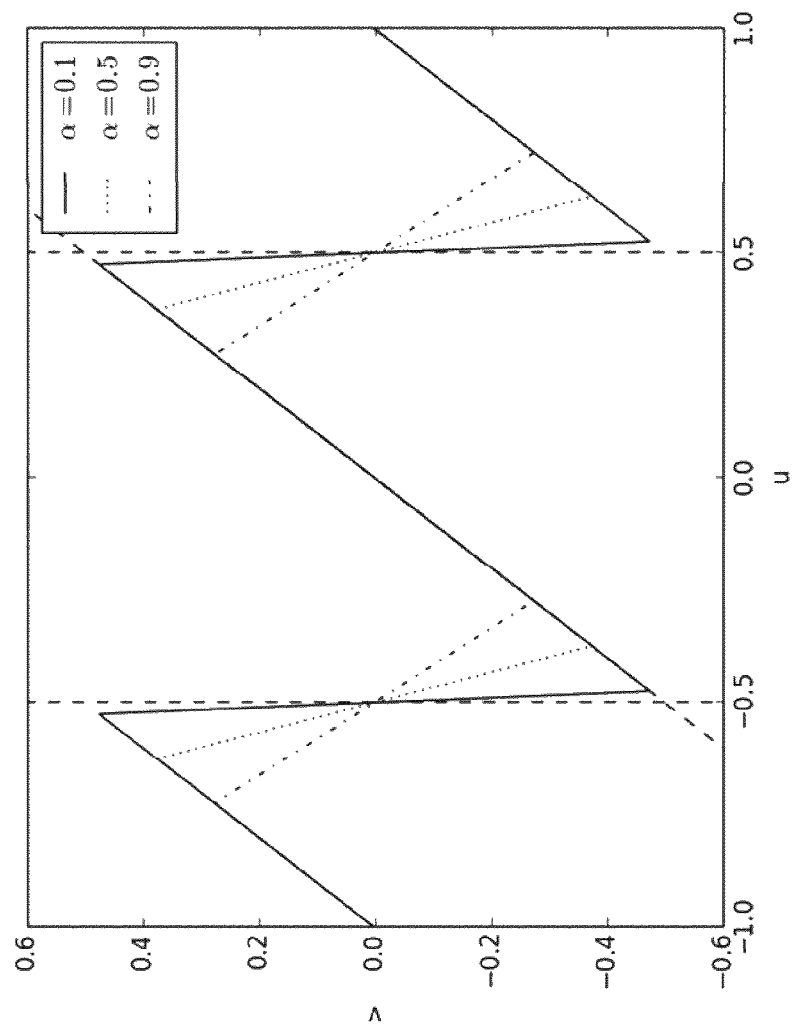
Figure 14:
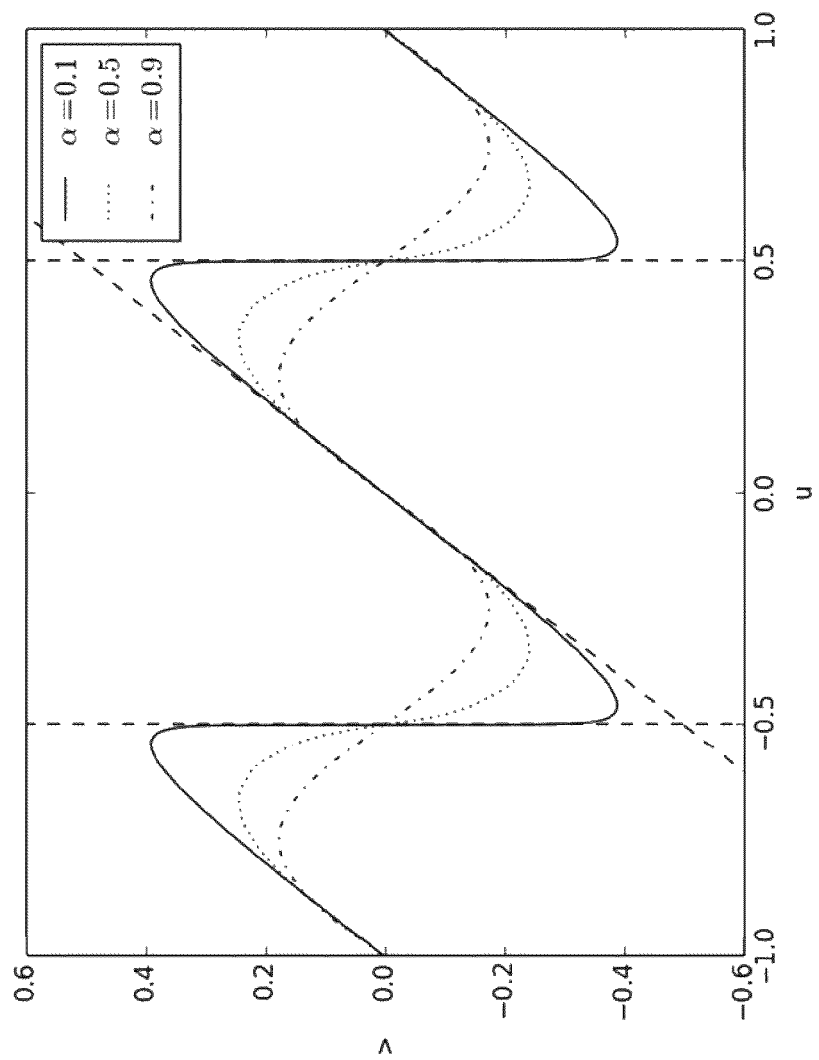

FIGS. 13 and 14 illustrate two specific examples of direction mapping functions that may be continuously adapted by adapting a parameter $\alpha \in [0,1]$. As illustrated, the figures may be adapted to provide a smoother or rawer mapping with $\alpha=0$ corresponding to the least smooth and $\alpha=1$ to a smoother shape of the direction mapping function.

The example of FIG. 13 corresponds to a direction mapping function which can be adapted between a sawtooth and triangle function in accordance with the following:

$$f_{example,1}: u \to \begin{cases} f_{sawtooth}(u) & |f_{sawtooth}(u)| < \frac{1}{2} - \frac{\alpha}{4} \\ \frac{\alpha-2}{\alpha} f_{sawtooth}\left(u + \frac{1}{2}\right) & \text{otherwise} \end{cases}$$

In the second example (FIG. 14), the cone shape changes between a sawtooth mapping ($\alpha \to 0$) and a sine mapping ($\alpha=1$) according to $$f_{example,2}: u \to \frac{\alpha-2}{2\pi} \sum_{k=1}^{\infty} k^{\frac{\alpha}{\alpha-1}} \sin 2\pi k\left(u - \frac{1}{2}\right).$$

In both cases $f'(0)=1$ $\forall \alpha$ corresponding to equal maximum parallax while $f'(\frac{1}{2})$, which corresponds to the largest negative slope and thus the strength of the cone transition, is influenced by $\alpha$. For $\alpha \to 0$ this slope approaches $-\infty$ and for $\alpha=1$ the slope is just $-1$.

In these examples, the direction mapping function may accordingly be modified such that the deviation of the scene viewpoint angle from the central scene viewpoint angle is reduced for some view cone projection angles. As the central scene viewpoint angle (corresponding to the central view cone projection angle for the view cones) in the examples is zero, this corresponds to reducing the magnitude of the scene viewpoint angle for at least some values of the view cone projection angles. In particular, the scene viewpoint angles in two edge intervals of the view cones are reduced with respect to a direct linear mapping (i.e. in comparison to the sawtooth).

Specifically, as a is increased, the scene viewpoint angles in the edge intervals are reduced. As a consequence, the views generated toward the edges of a view cone will deviate less from the central view, and indeed towards the cone transitions will tend to approach this central view. This allows a flexible adaptation which provides an improved trade-off between the conflicting desires and preferences.

Indeed, for the second example, the direction mapping function may be varied from providing a homogenous view in the entire view cone but with a potentially high blur level and strong stereo inversion to providing a view cone which is non-homogenous and has a reduced angle interval in which a strong 3D effect is provided, but which also has substantially less blur and a much softer stereo inversion.

Figure 15:
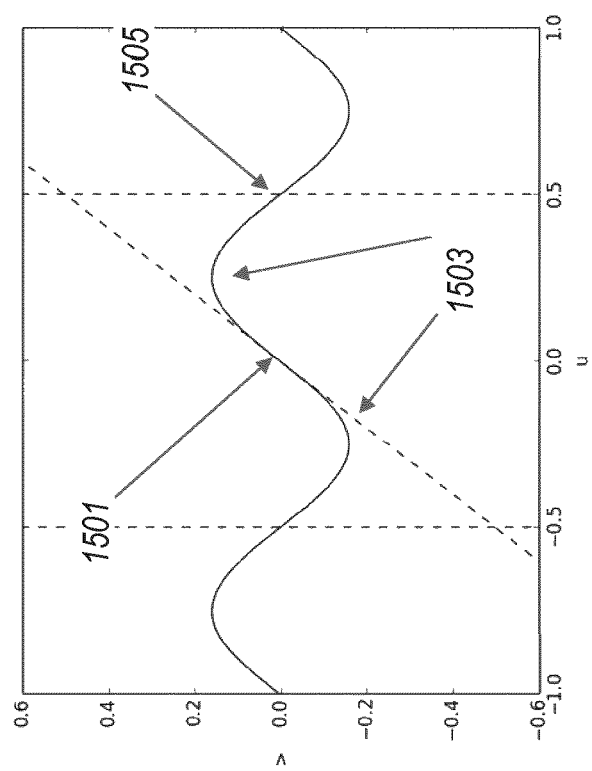

For example, for a sine wave mapping, different perceptions may be provided in different areas of the view cone as illustrated in FIG. 15. In the example, the area of the view cone indicated by arrow 1501 will tend to provide a strong 3D effect with high parallax but also with potentially significant blur. The interval around 1503 will tend to provide a low (or no) 3D effect but also provides a low level of blur. The interval around 1505 provides a stereo inversion but at a level that is typically tolerable (and much reduced with respect to the maximum stereo inversion for a linear mapping).

As can be seen, in the example of FIG. 14, the scene view point direction deviation is reduced in the two edge intervals of the curve by increasing the parameter $\alpha$. However, this not only results in the scene view point direction deviation (i.e. the deviation with respect to the center) being reduced but also results in the magnitude of the derivative of the direction mapping function reducing towards the edges of the cone. A reduced stereo inversion effect can specifically be achieved.

The viewer characteristic is indicative of the number of current viewers, and the adaptor 811 may be arranged to adapt the direction mapping function in response to the number of current viewers.

The number of current viewers may for example be determined by the viewing processor 809 as the number of faces detected in an image received from a video camera pointed towards the viewing area.

The adaptation of the direction mapping function to the number of viewers may provide an improved user experience in many situations.

For example, when a lenticular based autostereoscopic display has so many viewers that they form more than one row, it may become difficult for viewers in the back to find a good position within the viewing cone. As a result, these viewers will typically move towards the edges of the viewing cone. This is in contrast to the scenario where only a few or indeed only one viewer is present. In this case, the viewer will tend to position himself in the center of a view cone (or the autostereoscopic display may be an adaptive display which steers a view cone towards the viewer). Thus, the more users that are present, the more likely it is that a larger interval of the view cone is continuously used by the group of viewers, and the more likely is it that there may be a viewer positioned further from the center of the view cone.

However, this also increases the risk of users temporarily moving even further towards the edge of the view cone, or indeed even moving across the view cone transition/border.

In the specific example, the system may accordingly be arranged to adapt the direction mapping function and the involved trade-offs in dependence on the number of users, and thus in dependence on the likely distribution of users in the view cone.

The approach can thus exploit that the size of the sweet spot of a view cone in terms of acceptable blur, stereo parallax and 3D inversion depends on the direction mapping function (which may also be referred to indirectly as the cone shape). For a linear mapping (sawtooth mapping), the region with stereo parallax and low blur is large but so is the strength of the 3D inversion and the blur in between sweet spots. For a smooth cone (such as for a sine wave mapping), the useful region is smaller but blur and 3D inversion is much reduced. The adaptor 811 may in the example adapt the direction mapping function between these extremes and may e.g. also provide a semi-smooth cone/mapping which has properties that are in between both extremes.

In many examples, the preferred option for a scenario with a small group of semi-static viewers may indeed be a semi-smooth cone. This can typically prevent strong distractions when a person sporadically moves out of the view cone center yet still provides a relatively large sweet spot with a strong 3D effect.

However, with an increasing number of viewers per sweet spot, some viewers may be forced to remain in the off-centre part of the viewing cone. Those users will suffer from the blurry cone sides of a semi-smooth cone (due to the relatively high slope) as well as possibly a relatively strong stereo inversion. In order to address this, the adaptor 811 may modify the direction mapping function as the detected number of viewers increases.

In some embodiments, the adaptor 811 may be arranged to increase the smoothness of the direction mapping function when the number of viewers increases. Thus, specifically, the adaptor 811 may be arranged to increase the value of $\alpha$ of the direction mapping function examples of FIGS. 13 and 14. In this example, the direction mapping function/cone shape is made smoother resulting in the off-centre users losing some stereo parallax (and thus 3D perception) but also suffering less from blur and being less likely to experience strong stereo inversion effects if they temporarily move. Thus, in the approach, the 3D effect for at least some viewer positions is reduced for an increasing number of viewers being present.

Specifically, as previously mentioned, the adaptor 811 may be arranged to adapt the direction mapping function to reduce a scene view point direction deviation for at least some view cone projection directions when the viewer characteristic indicates an increasing number of current viewers. The scene view point direction deviation reflects the deviation from the central scene view point direction, i.e. in the specific example it reflects the difference between the scene viewpoint angle and the central scene viewpoint angle (the scene viewpoint angle for the center of the view cones). In the example, the central scene viewpoint angle is zero and thus the adaptor 811 may be arranged to reduce the value of the magnitude of the viewpoint angles in at least some intervals of the view cone projection angles.

Specifically, the magnitude of the scene viewpoint angles are reduced in the edge intervals of the view cones when the number of viewers increase.

As an example, when the viewing processor 809 detects that three viewers are present, the adaptor 811 may possible select a value for the parameter $\alpha$ of 0.5. The corresponding direction mapping function of FIG. 13 or FIG. 14 may accordingly be used to provide a reasonable compromise between the different effects previously described.

If the viewing processor 809 now proceeds to detect that the number of current viewers has increased to five viewers, the adaptor 811 may proceed to increase the value of $\alpha$ of 0.5 to 0.9. This results in a smoother direction mapping function and specifically results in the magnitude of the scene viewpoint angle being reduced in the edge intervals. E.g. for the example of FIG. 13, the magnitude of the scene viewpoint angle (and thus the deviation from the central scene viewpoint angle of zero) is reduced for view cone projection angles in the intervals of [−0.5;−0.3] and [0.3;0.5]. For the example of FIG. 14, the magnitude of the scene viewpoint angle (and thus the deviation from the central scene viewpoint angle of zero) is reduced for view cone projection angles in the intervals of [−0.5;−0.15] and [0.15;0.5]. In the example, the magnitude of the scene viewpoint angle is reduced in this interval, and indeed so is the magnitude of the derivative of the direction mapping function. Thus, in the interval, rather than the scene viewpoint angle increasing at the same rate as at the center of the cone, the derivative is reduced such that a smaller change in the scene viewpoint angle for a given change in the view cone projection angle occurs.

If the viewing processor 809 now detects that the number of viewers is reduced to two viewers, the adaptor 811 may e.g. proceed to reduce the variable a to 0.1. This results in the scene viewpoint angles being increased in the intervals of [−0.5;−0.3] and [0.3;0.5] for the example of FIG. 13 and in the intervals of [−0.5;−0.15] and [0.15;0.5] for the example of FIG. 14. Correspondingly, for FIG. 14, the derivative of the direction mapping function is increased as the number of viewers is reduced.

If the viewing processor 809 then detects that the number of viewers is increased to three viewers, the adaptor 811 may e.g. proceed to set the variable a to 0.5 again. This results in the scene viewpoint angles being decreased in the intervals of [−0.5;−0.4] and [0.4;0.5] for the example of FIG. 13 and in the intervals of [−0.5;−0.2] and [0.2;0.5] for the example of FIG. 14. Further, the change to the direction mapping function in FIG. 14 also results in the derivative of the direction mapping function decreasing in this interval as the number of viewers increases.

In some embodiments, the adaptor 811 may be arranged to adapt the direction mapping function to provide a reduced interval of view cone projection directions for which a derivative of the direction mapping function has a same sign as a derivative of the direction mapping function for a central view cone projection direction in response to the viewer characteristic being indicative of an increasing number of current viewers.

Thus, the interval in which no stereo inversion occurs may be adapted based on the number of current viewers, and specifically the interval may be reduced for more users.

In the system of FIG. 8, this may also be achieved by increasing the value α for an increasing number of viewers. For example, for the example of FIG. 13, changing the value of a from 0.5 to 0.9 results in the transition in the derivative/slope of the direction mapping function moving from −0.4 to −0.3 and from 0.4 to 0.3. Thus, the interval in which the slope of the direction mapping function is the same as for the central view cone projection angle is reduced from [−0.4; 0.4] to [−0.3;0.3]. Similarly, when the number of viewers reduces to 2, the interval may be increased to [−0.45;0.45].

Thus, it will be appreciated that the previously provided description also provides an example of the adaptor 811 adapting the interval in which no stereo inversion occurs.

In some embodiments, the adapter 811 is arranged to specifically adapt the direction mapping function to reduce a magnitude of a derivative of the direction mapping function at a view cone edge projection direction in response to the viewer characteristic being indicative of an increasing number of current viewers. An example of this approach has been described with reference to FIG. 14 which clearly illustrates intervals in which the derivative is lower for α=0.1 than for α=0.5 (and for α=0.5 than for α=0.9). As α is increased for an increasing number of users, the derivative of the direction mapping function is reduced towards the cone edges thereby reducing e.g. the strength of a possible stereo inversion. Thus, in some embodiments, the (inverse) parallax at the cone transitions may be reduced for an increased number of viewers.

For example, it can clearly be seen from FIG. 14 that the magnitude of the derivative/slope of the direction mapping function reduces as a changes from 0.1 to 0.9. Thus, the previously described example also provides an example of the adaptor 811 modifying the derivative of the direction mapping function at cone transitions depending on the number of users.

The approach of increasing the smoothness of the direction mapping function for an increasing number of current viewers may result in off-centre users (which are more likely when many viewers are present) losing some parallax/3D effect but instead they may suffer less from blur and have a reduced risk of stereo inversion. This may be advantageous in many scenarios.

It will be appreciated that although the examples above focus on a change of the direction mapping function towards the edges of the cone, and whereas this may be particularly advantageous in many embodiments, the described approach is not limited to such applications. For example, in some embodiments, the direction mapping function may be a sawtooth function (i.e. it may simply be a linear proportional relationshin within the cone interval) with the gradient being dependent on the viewer characteristic, and specifically with the gradient reducing for an increasing number of users.

In some embodiments, the adaptor 811 may be arranged to adapt the direction mapping function to provide a reduced interval of view cone projection directions for which a derivative of the direction mapping function has a same sign as a derivative of the direction mapping function for a central view cone projection direction in response the viewer characteristic being indicative of a decreasing number of current viewers.

Thus, the interval in which no stereo inversion occurs may be adapted based on the number of current viewers, and specifically the interval may be reduced for fewer users.

In the system of FIG. 8, this may also be achieved by increasing the value α for a decreasing number of viewers. For example, changing the value of α from 0.5 to 0.9 results in the transition in the derivative/slope of the direction mapping function moving from −0.4 to −0.4 and from 0.3 to 0.4. Thus, the interval in which the slope of the direction mapping function is the same as for the central view cone projection angle is reduced from [−0.4;0.4] to [−0.3;0.3]. Similarly, when the number of viewers reduces to 2, the interval may be increased to [−0.45;0.45].

Accordingly, it will be appreciated that the previously provided description also provides an example of the adaptor 811 adapting the interval in which no stereo inversion occurs.

In some embodiments, the adapter 801 is arranged to adapt the direction mapping function to reduce a magnitude of a derivative of the direction mapping function for a view cone transition projection angle in response to the viewer characteristic being indicative of an increasing number of current viewers.

Thus, in some embodiments, the (inverse) parallax at the cone transitions may be reduced for an increased number of viewers.

This effect may as previously described in the system of FIG. 8 be achieved by modifying the value α. For example, it can clearly be seen from FIG. 13 that the magnitude of the derivative/slope of the direction mapping function reduces as a changes from 0.1 to 0.9. Thus, the previously described example provides an example of the adaptor 811 modifying the derivative of the direction mapping function at cone transitions depending on the number of users.

In some embodiments, the viewer characteristic may further be indicative of a position of at least one viewer. For example, the viewing processor 809 may detect a position of the person furthest towards a view cone edge. E.g. an image may be captured by a video camera and evaluated by the viewing processor 809 in order to detect faces in the image. The position of the face furthest towards a side of the image may then be used as an indication of the position of the viewer closest to a cone transition.

In many embodiments, the adaptor 811 may be arranged to increase the smoothness of the direction mapping function the further the viewer position is from the center of the view cone.

Specifically, the viewing processor 809 may generate an indication of a viewer position, which specifically may be the position of a viewer closest to a cone transition. The adaptor 811 may then be arranged to determine an indication of the distance from the center of the viewing cone to the position, and to increase the smoothness the larger this distance is.

Thus, in some embodiments, the adaptor 811 may be arranged to adapt the direction mapping function to reduce a scene view point direction deviation for at least some view cone projection directions in response to an increasing distance between a viewer position indicated by the viewer characteristic and a central view cone projection angle where the scene view point direction deviation reflects the deviation from a central cone scene view point direction.

The adaptor 811 may for example adapt the parameter α to control the smoothness of the curve. Specifically, the value of α may be increased from a value of 0.1 when the adaptor 811 determines that the distance to the center is close to zero to a value of 0.9 when the adaptor 811 determines that the viewer is close to a cone transition.

This approach may mitigate stereo inversion and reduce blur at the cost of the 3D effect for users towards the edges of the view cones.

In other embodiments, the adaptor 811 may be arranged to decrease the smoothness of the direction mapping function the further the viewer position is from the center of the view cone.

For example, the adaptor 811 may adapt the parameter α to be decreased from a value of 0.9 when the adaptor 811 determines that the distance to the center is close to zero to a value of 0.1 when the adaptor 811 determines that the viewer is far from the center. Such an approach will tend to increase the provision of a 3D effect to viewers towards the edge of the viewing cones but at the expense of increased blur and an increased risk of significant stereo inversion.

In some embodiments, the adaptor 811 may further be arranged to adapt the direction mapping function based on a viewer movement indication. Thus, the viewing processor 809 may be arranged to generate an indication of the current viewer movement. This may for example be achieved by detecting how much and how quickly faces detected in images from a video camera move.

In such embodiments, the adaptor 811 may be arranged to increase the smoothness of the direction mapping function in response to a detection of increasing viewer movement. Specifically, the adaptor 811 may be arranged to reduce a scene view point direction deviation for at least some view cone projection directions in response to the viewer characteristic indicating increasing viewer movement (where a scene view point direction deviation reflects a deviation from a central cone scene view point direction).

The viewer movement may for example be an amplitude of movement, a direction of movement, or a speed of movement. For example, the adaptor 811 may track viewers moving in images generated by a camera (e.g., faces may be detected and tracked). In some embodiments, the adaptor 811 may simply determine a degree of movement in the image, such as e.g. an average or maximum speed of movement for an image object corresponding to a face. It may then be arranged to reduce the degree of parallax (e.g. by increasing the value α) for an increasing average or maximum movement as this may increase the risk of a viewer experiencing a stereo inversion. For example, if, say, two faces are stationary in the image, this may reflect a viewer scenario wherein two people are sitting and watching the display. The probability of these moving is relatively low and therefore a high degree of stereo effect can be provided (a can be set to a low value). However, if both face image objects are moving quickly in the image, this is likely to reflect the viewers moving around in the viewer environment corresponding to an increased risk of a viewer moving to a position where stereo inversion can be experienced. Therefore, when the average or maximum movement speed is increased, the magnitude of the scene view point direction deviation (and/or the derivative of the direction mapping function) may be reduced for typically the end cone intervals.

Similarly, the adaptor 811 may e.g. be arranged to differentiate between movement in the direction towards a cone center or towards the edge of a cone. The value of e.g. the parameter α may be decreased in the former case and increased in the latter.

As another example, the adaptor 811 may take into account the amplitude of the movement, e.g. as measured by the distance from the center of the cone (e.g. measured as the difference from the image object to the center of the captured image). The further from the center of the cone that the movement occurs, the more it may affect the direction mapping function adaptation. As a specific example, the scene view point direction deviation may be reduced if the degree of movement of face image objects further than a given distance from the center exceeds a threshold.

In some embodiments, the adaptor 811 may be arranged to adapt the direction mapping function to provide a reduced interval of view cone projection directions for which a derivative of the direction mapping function has a same sign as a derivative of the direction mapping function for a central view cone projection direction in response the viewer characteristic being indicative of an increasing viewer movement.

In some embodiments, the adaptor 811 may be arranged to adapt the direction mapping function to reduce a magnitude of a derivative of the direction mapping function for typically an edge view cone projection ratio in response to the viewer characteristic being indicative of an increasing viewer movement.

As previously described, such adaptations of the direction mapping function can in the system of FIG. 8 be achieved by modifying the parameter α. Specifically, the adaptor 811 may be arranged to increase a for the viewing characteristic being indicative of an increasing user movement.

Such an approach may provide an improved user experience in many embodiments. Indeed, as mentioned the concept of smooth direction mapping functions is useful to reduce discomfort from stereo inversion and the significant blur of out-of-screen objects near view cone transitions. However this may be more advantageous and important when viewers are moving with respect to the display. Semi-static users may benefit more from a less smooth cone shape due to the improved stereo parallax and a reduce probability of stereo inversion.

The adaptation of the direction mapping function to provide a smoother cone when a high degree of viewer movement is present is particularly advantageous because the wobbling effect of walking past a smooth cone display in this case tends to not cause (much) discomfort whereas the sharp cone transitions of a less smooth cone are likely to cause more discomfort or at least be distracting.

In some embodiments, the adaptor 811 may be arranged to adapt the direction mapping function to adapt the display image to correspond to a stereo image if the viewer characteristic is indicative of a number of viewers being less than a threshold, and specifically if the number of viewers is 1.

Thus, in some embodiments, the adaptor 811 may switch from generating a relatively large number of views to generating only two views when only one user is present. Thus, the adaptor 811 may in this case switch to present a stereo image.

The adaptor 811 may in this case adaptively switch the operation of the autostereoscopic display to provide a stereo image (stereo-on-multiview). As a result, the blur may be reduced while still allowing a high amount of parallax.

In some embodiments, the adapter may be arranged to adapt the direction mapping function to adapt the display image to provide a plurality of sub-viewing cones within each viewing cone of the plurality of viewing cones if the viewer characteristic is indicative of a number of viewers exceeding a threshold.

Figure 16:
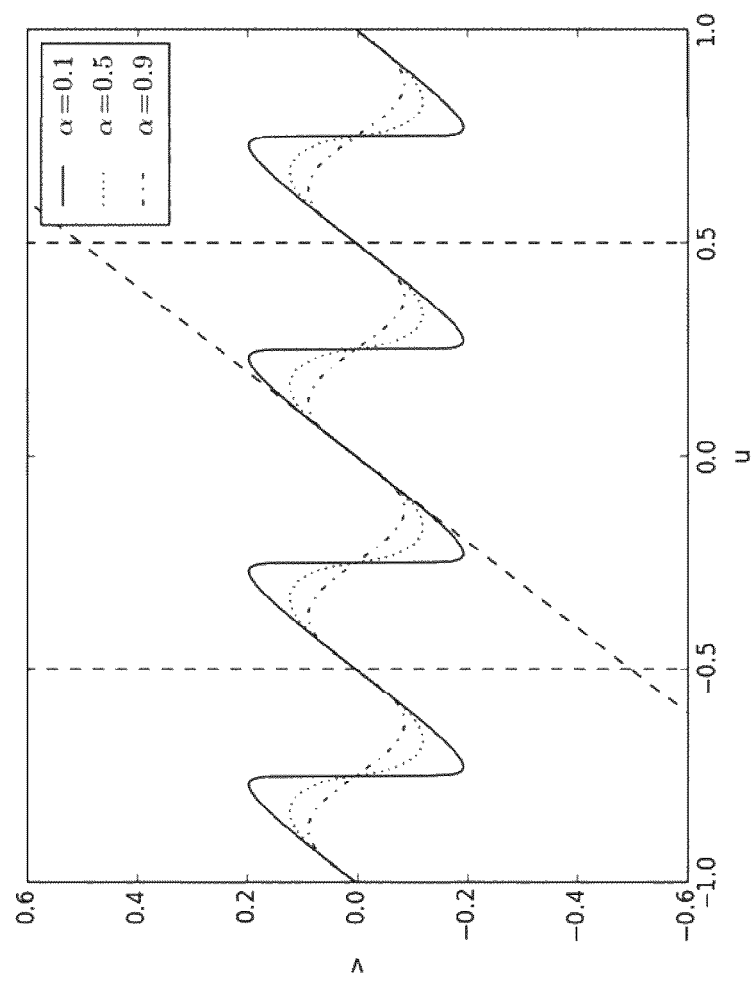

When watching an autostereoscopic display, viewers in the front will tend to position themselves towards the view cone center. This often leaves only minor space on either side of the cone center for the users that are further back. In some embodiments, the adaptor 811 may in this case modify the direction mapping function such that the display arrangement 501 ends up effectively projecting a plurality of sub-view cones within a given cone. An example of such a direction mapping function is illustrated in FIG. 16.

Specifically, a basic mapping function/cone shape functions f(u) as previously described may be modified to comprise multiple versions of the applied mapping. For example, if M sub-cones are desired, this can be achieved by modifying the basic direction mapping function f(u) according to:

$$g: u \rightarrow f(Mu)$$

Thus, the direction mapping function may be generated to comprise a plurality of repetitions of the same non-repeating direction mapping function within each view cone.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An apparatus for generating a display image for a display panel of an autostereoscopic display, wherein the autostereoscopic display is configured to project the display image in a plurality of view cones, the apparatus comprising:
   a source apparatus, wherein the source apparatus is arranged to provide a three dimensional representation of a scene;
   a generator circuit, wherein the generator circuit is arranged to generate the display image from the three dimensional representation of the scene,
      wherein the generator circuit is arranged to determine a scene view point direction indication reflecting a view point direction for the scene in response to a direction mapping function and a view cone projection direction indication,
      wherein the view cone projection direction indication reflects a projection direction for at least one pixel of the display image within the view cones,
      wherein the direction mapping function reflects a relationship between view cone projection directions and scene view point directions, and
      wherein the generator circuit is arranged to determine a pixel value corresponding to the view point direction from the three dimensional representation for the at least one pixel of the display image;
   a processor circuit, wherein the processor circuit is arranged to determine a viewer characteristic indicative of an increasing number of current viewers; and
   an adapter circuit, wherein the adaptor circuit is arranged to adapt, in response to the viewer characteristic indicative of the increasing number of current viewers, the direction mapping function to reduce, for at least one view cone projection direction, at least one of a scene view point direction deviation from a scene view point direction corresponding to a central view cone projection direction, and a magnitude of a derivative of the direction mapping function,
   wherein the autostereoscopic display comprises the display panel and a view forming optical element, and
   wherein the view forming optical element is arranged to project the display image in a plurality of view cones.

2. The apparatus of claim 1, wherein the adapter circuit is arranged to adapt the direction mapping function so as to reduce the scene view point direction deviation for at least one view cone projection directions in response to the viewer characteristic being indicative of an increasing number of current viewers.

3. The apparatus of claim 1, wherein the adapter circuit is arranged to adapt the direction mapping function to reduce the derivative of the direction mapping function for at least one view cone projection directions for at least one view cone projection directions in response to the viewer characteristic being indicative of an increasing number of current viewers.

4. The apparatus of claim 1, wherein the adapter circuit is arranged to adapt the direction mapping function to provide a reduced interval of view cone projection directions for which the derivative of the direction mapping function has a same sign as a derivative of the direction mapping function for a central view cone projection direction in response the viewer characteristic being indicative of an increasing number of current viewers.

5. The apparatus of claim 1, wherein the adapter circuit is arranged to adapt the direction mapping function to reduce the magnitude of the derivative of the direction mapping function at a view cone edge projection direction in response to the viewer characteristic being indicative of an increasing number of current viewers.

6. The apparatus of claim 1, wherein the viewer characteristic is indicative of a position of at least one viewer.

7. The apparatus of claim 6, wherein the adapter circuit is arranged to adapt the direction mapping function to reduce the scene view point direction deviation for at least one view cone projection directions in response to an increasing distance between a viewer position indicated by the viewer characteristic and a central view cone projection direction.

8. The apparatus of claim 6, wherein the adapter circuit is arranged to adapt the direction mapping function to reduce the scene view point direction deviation for at least one view cone projection directions in response to the viewer characteristic being indicative of increasing viewer movement.

9. The apparatus of claim 1, wherein the adapter circuit is arranged to adapt the direction mapping function to arrange the display image to correspond to a stereo image if the viewer characteristic is indicative of a number of viewers is less than a threshold.

10. The apparatus of claim 1, wherein the adapter circuit is arranged to adapt the direction mapping function to arrange the display image to provide a plurality of sub-viewing cones within each viewing cone of the plurality of viewing cones if the viewer characteristic is indicative of a number of viewers exceeding a threshold.

11. The apparatus of claim 1, wherein the three dimensional representation of the scene is an input three dimensional image and the generator circuit is arranged to determine the pixel value corresponding to the view point direction by applying a view direction transformation to the input three dimensional image.

12. The apparatus of claim 11, wherein the direction mapping function comprises a disparity mapping function mapping from a disparity of the input three dimensional image to a disparity of the display image, and the view direction transformation comprises applying a pixel shift to pixels of the input three dimensional image to generate pixels for the display image, wherein the pixel shift is dependent on the disparity mapping function.

13. An autostereoscopic display, comprising:
a display arrangement, the display arrangement comprising a display panel and a view forming optical element wherein the view forming optical element is arranged to project the display image in a plurality of view cones;
a source apparatus, wherein the source apparatus is arranged to provide a three dimensional representation of a scene;
a generator circuit, wherein the generator circuit is arranged to generate the display image from the three dimensional representation of the scene,
wherein the generator circuit is arranged to determine a scene view point direction indication reflecting a view point direction for the scene in response to a direction mapping function and a view cone projection direction indication,
wherein the view cone projection direction indication reflects a projection direction for the at least one pixel of the display image within the view cones,
wherein the direction mapping function reflects a relationship between view cone projection directions and scene view point directions, and
wherein the generator circuit is arranged to determine a pixel value corresponding to the view point direction from the three dimensional representation for the at least one pixel of the display image;
a processor circuit, wherein the processor circuit is arranged to determine a viewer characteristic indicative of an increasing number of current viewers; and
an adapter circuit, wherein the adaptor circuit is arranged to adapt, in response to the viewer characteristic indicative of the increasing number of current viewers, the direction mapping function to reduce, for at least one view cone projection direction, at least one of a scene view point direction deviation from a scene view point direction corresponding to a central view cone projection direction, and a magnitude of a derivative of the direction mapping function.

14. A method for generating a display image for a display panel of an autostereoscopic display, the autostereoscopic display comprising a display arrangement comprising the display panel and a view forming optical element, wherein the view forming optical element is arranged to project the display image in a plurality of view cones; the method comprising:
providing a three dimensional representation of a scene;
generating for at least one pixel of the display image from the three dimensional representation of the scene, wherein the generating comprises:
determining a scene view point direction indication reflecting a view point direction for the scene in response to a direction mapping function and a view cone projection direction indication,
wherein the view cone projection direction indication reflects a projection direction for the at least one pixel of the display image within the view cones,
wherein the direction mapping function reflects a relationship between view cone projection directions and scene view point directions; and
determining a pixel value corresponding to the view point direction from the three dimensional representation for the at least one pixel of the display image;
determining a viewer characteristic indicative of an increasing number of current viewers; and
adapting the direction mapping function in response to the viewer characteristic indicative of the increasing number of current viewers, to reduce, for at least one view cone projection, at least one of a scene view point direction deviation from a scene view point direction corresponding to a central view cone projection direction, and a magnitude of a derivative of the direction mapping function.

15. The method of claim 14, wherein the adapting is arranged to adapt the direction mapping function to reduce the scene view point direction deviation for at least one view cone projection directions in response to the viewer characteristic being indicative of an increasing number of current viewers.

16. The method of claim 14, wherein the adapting is arranged to adapt the direction mapping function to reduce the derivative of the direction mapping function for at least one view cone projection directions for at least one view cone projection directions in response to the viewer characteristic being indicative of an increasing number of current viewers.

17. The method of claim 14, wherein the adapting is arranged to adapt the direction mapping function to provide a reduced interval of view cone projection directions for which the derivative of the direction mapping function has a same sign as a derivative of the direction mapping function for a central view cone projection direction in response the viewer characteristic is indicative of an increasing number of current viewers.

18. The method of claim 14, wherein the adapting is arranged to adapt the direction mapping function to reduce the magnitude of the derivative of the direction mapping function at a view cone edge projection direction in response to the viewer characteristic being indicative of an increasing number of current viewers.

19. The method of claim 14, wherein the viewer characteristic is indicative of a position of at least one viewer.

20. The method of claim 19, wherein the adapting is arranged to adapt the direction mapping function to reduce the scene view point direction deviation for at least one view cone projection directions in response to an increasing distance between a viewer position indicated by the viewer characteristic and a central view cone projection direction.

* * * * *